US00RE43271E

(19) United States
(12) Reissued Patent
Sakamoto et al.

(10) Patent Number: US RE43,271 E
(45) Date of Reissued Patent: Mar. 27, 2012

(54) DIGITAL SIGNAL TRANSMISSION METHOD DIGITAL SIGNAL TRANSMISSION SYSTEM, DIGITAL SIGNAL TRANSMITTING APPARATUS AND RECORDING MEDIUM

(75) Inventors: Ichiro Sakamoto, Tokyo (JP); Kenji Tomizawa, Kanagawa (JP); Hiraku Inoue, Tokyo (JP); Makoto Sato, Tokyo (JP)

(73) Assignee: Sony Corporation, Tokyo (JP)

(21) Appl. No.: 11/497,862

(22) Filed: Aug. 2, 2006

Related U.S. Patent Documents

Reissue of:
(64) Patent No.: 6,788,653
Issued: Sep. 7, 2004
Appl. No.: 09/490,827
Filed: Jan. 25, 2000

(30) Foreign Application Priority Data

Jan. 27, 1999 (JP) ..... 11-019153

(51) Int. Cl.
*H04B 1/44* (2006.01)
*H04J 3/16* (2006.01)

(52) U.S. Cl. ..... 370/282; 370/296; 370/465

(58) Field of Classification Search ..... 370/282, 370/278, 285, 465, 466, 463, 252, 348, 401, 370/469, 293, 297, 529, 296; 709/223
See application file for complete search history.

(56) References Cited

U.S. PATENT DOCUMENTS 4,365,313 A 12/1982 Menezes et al. ..... 386/52
4,394,745 A 7/1983 Menezes et al. ..... 386/54
6,215,793 B1 * 4/2001 Gultekin et al. ..... 370/465
6,272,170 B1 * 8/2001 Chu ..... 375/222
6,285,659 B1 * 9/2001 Feuerstraeter et al. ..... 370/244

(Continued)

FOREIGN PATENT DOCUMENTS

EP 0 762 684 3/1997

(Continued)

OTHER PUBLICATIONS

Digital Living Network Alliance, "DLNA Overview and Vision Whitepaper," 2006, pp. 1-17.

(Continued)

*Primary Examiner* — Brian Nguyen
(74) *Attorney, Agent, or Firm* — Frommer Lawrence & Haug LLP; William S. Frommer; Thomas F. Presson

(57) ABSTRACT

An object of the invention is to arrange so that the digital signal transmission between specific equipments connected with each other by the transmission line of a fixed standard can be performed securely and satisfactorily.

When a digital signal destination is caused to receive a fixed digital signal sent out of a digital signal sender, the digital signal destination acquires at the request of the destination from the digital signal sender data on modes in which the digital signal sender is able to send out the digital signal, and a transmission mode of the digital signal is caused to be set by a command based on the acquired mode data from the digital signal destination. Moreover, when a digital signal destination is caused to receive a fixed digital signal sent out of a digital signal sender, a flag is added to the digital signal sent out of the digital signal sender, which indicates that the transmission rate is being adjusted based on the command from the digital signal destination.

57 Claims, 21 Drawing Sheets

U.S. PATENT DOCUMENTS

| | | | | |
|---|---|---|---|---|
| 6,317,417 | B1 * | 11/2001 | Childs et al. | 370/252 |
| 6,556,589 | B2 | 4/2003 | McRobert et al. | 370/501 |
| 6,584,109 | B1 | 6/2003 | Feuerstraeter et al. | 370/401 |
| 2003/0202539 | A1 * | 10/2003 | Fukunaga et al. | 370/489 |

FOREIGN PATENT DOCUMENTS

| | | |
|---|---|---|
| EP | 0-825-783 | 2/1998 |
| EP | 0-825-784 | 2/1998 |
| EP | 0-841-776 | 5/1998 |
| EP | 0-847-167 | 6/1998 |
| EP | 0-903-737 | 3/1999 |
| EP | 0-932-160 | 7/1999 |
| JP | 8 124291 | 5/1996 |
| JP | 9 128888 | 5/1997 |
| JP | 9 161350 | 6/1997 |
| JP | 10 285196 | 10/1998 |
| WO | WO-98-35348 | 8/1998 |

OTHER PUBLICATIONS

Digital Living Network Alliance, "Use Case Scenarios: White Paper," Jun. 2004, pp. 1-14.

Printer Working Group C (PWG-C) et al., "PWG-C proposal to the 1394 Trade Association AV WG: AV/C Managed Asynchronous Serial Bus Connections," 1394PXXXX.X-D1.00, Draft 1.00, Jul. 7, 1998, pp. 1-90, XP002215801.

Printer Working Group C (PWG-C) et al: "PWG-C proposal to the 1394 Trade Association AV WG : AV/C Managed Asynchronous Serial Bus Connections", 1394PXXXX.X-D1.00, Draft 1.00, Jul. 7, 1998 (Jul. 7, 1998), pp. 1-90, XP002215801.

* cited by examiner

FIG. 5

| | |
|---|---|
| 900h | Output Master Plug Register |
| 904h | Output Plug Control Register #0 |
| 908h | Output Plug Control Register #1 |
| ⋮ | ⋮ |
| 97Ch | Output Plug Control Register #30 |
| 980h | Input Master Plug Register |
| 984h | Input Plug Control Register #0 |
| 988h | Input Plug Control Register #1 |
| ⋮ | ⋮ |
| 9FCh | Input Plug Control Register #30 |

| | Command Type | |
|---|---|---|
| | Control | Status |
| FLOW CONFIGURATION (Transmission Setting Command) | ○ | ○ |
| FLOW ATTRIBUTES (Transmission Attributes Command) | —— | ○ |

FIG. 14

| | msb | | | | | | lsb |
|---|---|---|---|---|---|---|---|
| opcode | FLOW ATTRIBUTES | | | | | | |
| operand[0] | FLOW Mode | | | | | | |
| operand[1] | plug number | | | | | | |
| ⋮ operand[33] | FF | | | | | | |

FIG. 15

| | msb | | | | | | lsb |
|---|---|---|---|---|---|---|---|
| opcode | FLOW ATTRIBUTES | | | | | | |
| 0 | FLOW Mode | | | | | | |
| 1 | plug number | | | | | | |
| 2-5 | FLOW mode attributes[0] | | | | | | |
| ⋮ | ⋮ | | | | | | |
| 30-33 | FLOW mode attributes[7] | | | | | | |

FIG. 16

| FLOW mode attributes | Supported Mode |
|---|---|
| bit1 | Locked Normal (1x) |
| bit2 | Unlocked Flow Control (1x) |
| bit3 | Locked Flow Control (2x) |
| bit4 | Locked Flow Control (4x) |
| bit5 | Locked Flow Control (8x) |
| bit6 | Locked Flow Control (16x) |

FIG. 17

| | msb | | | | | | lsb |
|---|---|---|---|---|---|---|---|
| opcode | FLOW CONFIGURATION | | | | | | |
| 0 | Source | | | | | | |
| 1 | source plug number | | | | | | |
| 2 | reserved | | | flow mode | | | |

FIG. 18

| FLOW mode attributes | |
|---|---|
| 00 | Unlocked Normal (1x) |
| 01 | Locked Normal (1x) |
| 02 | Unlocked Flow Control (1x) |
| 03 | Locked Flow Control (2x) |
| 04 | Locked Flow Control (4x) |
| 05 | Locked Flow Control (8x) |
| 06 | Locked Flow Control (16x) |

FIG. 19

| | msb | | | | | | lsb |
|---|---|---|---|---|---|---|---|
| opcode | FLOW CONFIGURATION | | | | | | |
| 0 | Rate | | | | | | |
| 1 | source plug number | | | | | | |
| 2 | rate control | | | | | | |

FIG. 20

| rate control | |
|---|---|
| AA | Standard |
| BB | Fast |
| CC | Slow |

| | msb | | | | | | lsb |
|---|---|---|---|---|---|---|---|
| opcode | FLOW CONFIGURATION | | | | | | |
| 0 | Destination | | | | | | |
| 1-8 | source GUID | | | | | | |
| 9 | source subunit type | | | | | subunit ID | |
| 10 | source plug number | | | | | | |
| 11 | reserved | | | flow mode | | | |

DIGITAL SIGNAL TRANSMISSION METHOD DIGITAL SIGNAL TRANSMISSION SYSTEM, DIGITAL SIGNAL TRANSMITTING APPARATUS AND RECORDING MEDIUM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a digital signal transmission method and a digital signal transmission system as well as a transmitting apparatus forming this system and a recording medium for recording a program applied to this transmission system, which is preferably applicable to a case where audio data is transmitted, for example, according to IEEE (The Institute of Electronics Engineers, Inc.) 1394.

2. Description of the Related Art

An audio equipment as related art has been proposed, in which an audio signal is transmitted in the digital form so that the deterioration of sound quality can effectively be avoided.

Specifically, for example, when an audio signal reproduced by the compact disk player is recorded by means of a minidisk device in this sort of audio equipment, the compact disk player modulates the reproduced digital audio signal according to a clock signal of these digital audio signal for outputting. In contrast, the minidisk device on the receiving side employs the PLL circuit to reproduce a clock signal from the transmitted digital signal and then reproduces the transmitted digital signa with reference to the clock signal. In this way, it is arranged that this sort of audio equipment processes the digital audio signal transmitted in synchronism with a clock signal on the transmitting side, for example, to perform processing of recording and so on.

Incidentally, when the digital audio signal is transmitted in this manner, the receiving side will operate synchronously with the clock signal of transmitted digital audio signal. In this case, for example, the bus line of IEEE 1394 system is employed to connect a plurality of audio equipments and, for example, the digital audio signal reproduced from the disk, etc. of a single audio reproducing equipment is sent out to the bus line. That digital audio signal is received and recorded by a recording equipment connected to the bus line.

When such processing to record the digital audio signal is considered, it is necessary in the past that the reproducing equipment is perfectly synchronous with the recording equipment. It is undesirable that the transmitted digital signal contains jitters, whereas the complete elimination of the jitters is difficult.

Moreover, it is considered that, in order to synchronize the reproducing operation of reproducing equipment with the recording operation of recording equipment, control data regarding the reproducing operation, etc. is transmitted over the bus line to synchronize the two equipments. For example, the bus line of IEEE 1394 system is able to connect two or more equipments with one another. However, if the reproducing unit should receive, e.g. control data from another equipment during the recording operation to stop the reproduction, the recording would be interrupted to result in failure.

The present invention is made in view of the foregoing points and has an object that the digital signal transmission between specific equipments is carried out securely and satisfactorily.

SUMMARY OF THE INVENTION

In order to solve such problem, the present invention is arranged so that, when a digital signal destination is caused to receive a predetermined digital signal sent out of a digital signal sender, the digital signal destination may acquire from the digital signal sender, at the request of that destination, data on modes in which the digital signal sender is able to send out the digital signal, and a transmission mode of the digital signal may be caused to be set by a command based on the acquired mode data from the digital signal destination.

By doing in this way, the digital signal transmission from the digital signal sender to the digital signal destination is carried out in the mode selected among previously examined modes, thus enabling the digital signal transmission to be securely performed in the determined mode.

Furthermore, the present invention is arranged so that, when a digital signal destination is caused to receive a predetermined digital signal sent out of a digital signal sender, a flag is added to the digital signal sent out of the digital signal sender, which indicates that a transmission rate is being adjusted based on a command from the digital signal destination.

By doing in this manner, the destination is able to check the transmitted flag, so that the processing to eliminate the jitters by the fine adjustment of the transmission rate and the like will be allowed.

BRIEF DESCRIPTION OF THE DRAWINGS

FIG. 5 illustrates a structure of PCR;

FIG. 14 illustrates an example of the attributes command applied to a mode for carrying out the present invention;

FIG. 15 illustrates an example of the attributes command in response applied to a mode for carrying out the present invention;

FIG. 16 illustrates an example of data in response applied to a mode for carrying out the present invention;

FIG. 17 illustrates an example of the setting command applied to a mode for carrying out the present invention;

FIG. 18 illustrates examples of transmission modes applied to a mode for carrying out the present invention;

FIG. 19 illustrates an example of the setting command applied to a mode for carrying out the present invention;

FIG. 20 illustrates examples of the rate control data applied to a mode for carrying out the present invention;

DETAILED DESCRIPTION OF THE PREFERRED EMBODIMENTS

A mode for carrying out the present invention will be described below with reference to the accompanying drawings.

Figure 1:
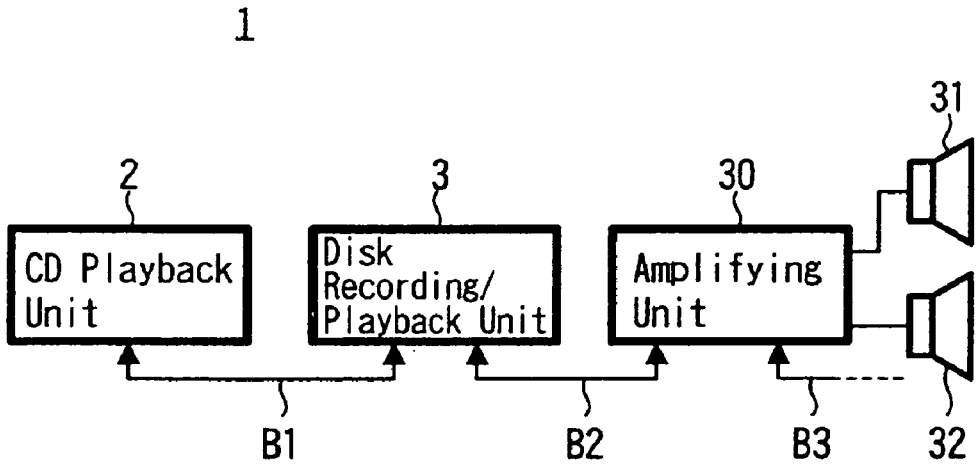
FIG. 1 is a block diagram showing an example of the entire structure of audio system according to a mode for carrying out the present invention.

FIG. 1 is a schematic block diagram showing an audio system according to a mode for carrying out the present invention. The audio system 1 of this example transmits a digital audio signal reproduced by a compact disk playback unit 2 to a disk recording/playback unit 3 using a magneto-optical disk (or optical disk) called a minidisk, etc. and records that signal by this disk recording/playback unit 3. Otherwise, the digital audio signal reproduced by the compact disk playback unit 2 is transmitted to an amplifying unit 30 for causing right and left speaker units 31, 32 connected to this amplifying unit 30 to output the audio signal as a sound. In this case, bus lines B1, B2 defined by the IEEE 1394 interface system connect the compact disk playback unit 2, the disk recording/playback unit 3 and the amplifying unit 30 with one another. Additionally, in the case of IEEE 1934 interface system, the connection may be made in any order. FIG. 1 shows only one example of them. Also, it may be possible to connect them to another audio equipment and the like not shown by another bus line B3.

Figure 2:
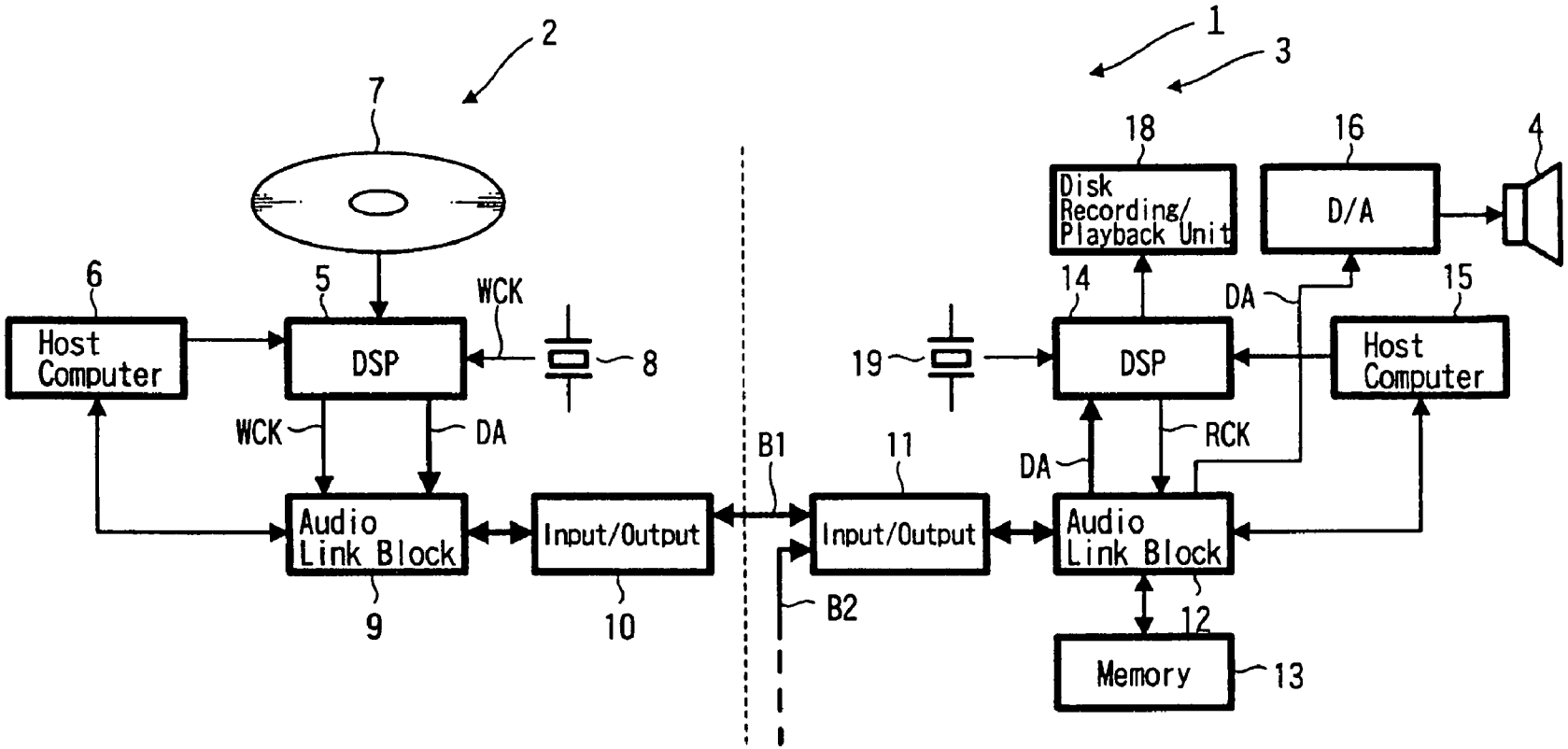
FIG. 2 is a block diagram showing the details of audio system according to a mode for carrying out the present invention.

FIG. 2 is a block diagram showing structures of the compact disk playback unit 2 and the disk recording/playback unit 3 of the audio system according to the present embodiment. In the compact disk playback unit 2, a digital signal processor (DSP) 5 drives to rotate an optical disk 7 being a digital audio disk under the control of a host computer 6 by means of a rotation drive mechanism not shown and reproduces the digital audio signal DA recorded on this optical disk 7 for outputting. On this occasion, the digital signal processor 5 produces a clock signal WCK by a built-in quartz oscillator circuit 8, reproduces the digital audio signal DA in synchronism with this clock signal WCK and also outputs the reproduced digital audio signal DA to an audio link block 9. In this case, the digital signal processor 5 plays back the compact disk 7 at a playback speed instructed by the host computer 6 to output the digital audio signal DA. Additionally, in the case of this example, it is arranged that the playback speed can be set for, other than one-fold speed (i.e. normal playback speed), two-fold speed, four fold speed, eight-fold speed and sixteen-fold speed.

Also, it is arranged that, after any of the playback speeds has been set, the reproduction rate can further be adjusted accurately by plus or minus several percent (e.g. ±1 percent or so).

The audio link block 9 makes the digital audio signal DA into the form of packets under the control of host computer 6 and controls an input-output circuit 10 to send out these packets to the disk recording/playback unit 3. Also, the audio link block 9 acquires the packets input through the input-output circuit 10 and sends out the contents of these packets to the host computer 6 as need arises.

The input-output circuit 10 parallel-serial converts output data of the audio link block 9 and after adding a predetermined data, biphase mark modulates for outputting to the bus line B1. In this way, the input-output circuit 10 superposes the clock signal WCK required for reproducing the packets on those packets input from the audio link block 9 for sending out to the bus line B1. Also, the input-output circuit 10 watches the packets transmitted over the bus line B1 to acquire the packets specifying the compact disk playback unit 2. The input-output circuit 10 then decodes these acquired packets and processes to serial-parallel convert for outputting to the audio link block 9.

The compact disk playback unit 2 is herein connected to the disk recording/playback unit 3 by the bus line B1 defined by the IEEE 1394 interface system. Thus, the audio link block 9 and the input-output circuit 10 make the digital audio signal DA into the packets according to the format defined by the IEEE 1394 and also notify data transmitted in the form of packets to the host computer 6. Specifically, the digital audio signal DA is transmitted as the isochronous transfer packet defined by the IEEE 1394 interface ensuring its real-time nature, as where the other data such as various kinds of control commands are transmitted as asynchronous transfer packet in asynchronous manner as occasion demands. The asynchronous transfer packet is a packet used for one-to-one correspondence, in which addresses of the data sender and its destination are indicated.

Figure 3:
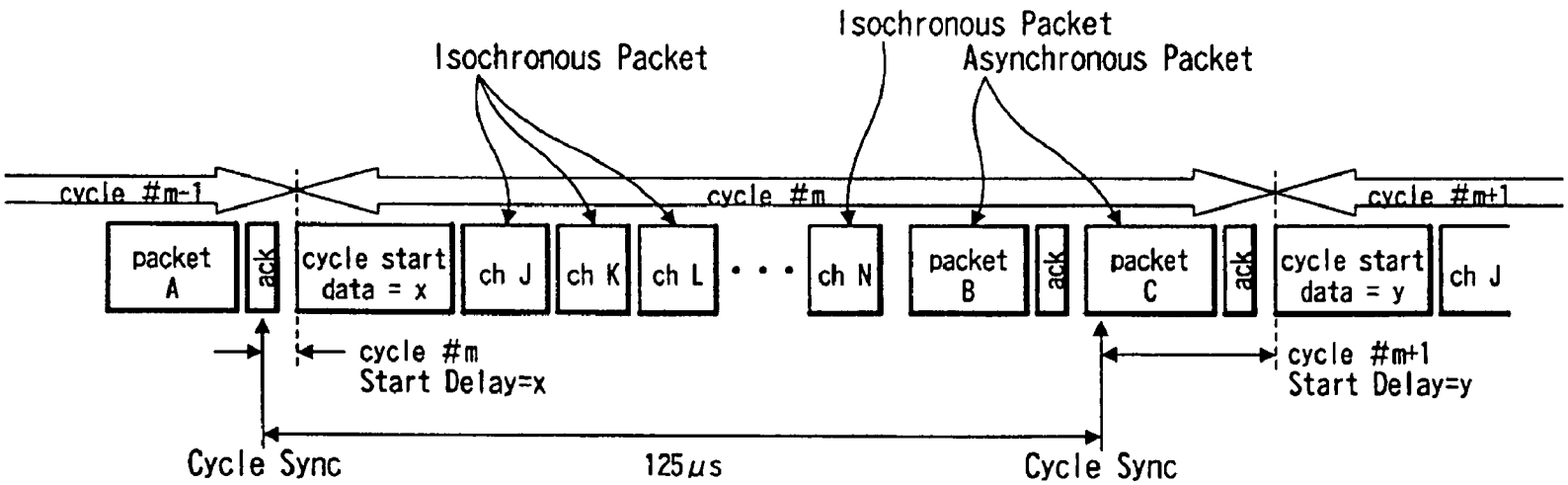
FIG. 3 shows a cyclic structure of transmission data of equipments connected by IEEE 1394 system.

In this context, the IEEE 1394 system will be described. FIG. 3 shows a cyclic structure in data transmission by equipments connected in accordance with the IEEE 1394. In the IEEE 1394, data are divided into packets and transmitted by timesharing in a cycle of 125 MS length. This cycle is created by a cycle start signal supplied from an electronic equipment having a cycle-master function. The isochronous packet ensures necessary band (This is a time unit but called a band.) for transmission from the start of every cycle. Thus, the isochronous transmission guarantees a data transmission within a fixed time. However, if transmission error occurs, data will be lost because of no protection mechanism.

During a time which is not used for the isochronous transmission in each cycle the electronic equipment which ensures a bus as a result of arbitration sends out the asynchronous packet. The asynchronous transmission ensures a secure transmission by using acknowledge and retry, but the transmission timing will be uncertain.

In order that predetermined electronic equipments may perform the isochronous transmission, the electronic equipments must correspond to an isochronous function. Moreover, at least one of the electronic equipments must have the cycle-master function. Furthermore, at least one of the electronic equipments connected to the IEEE 1394 serial bus must have an isochronous-resource-manager function.

Figure 4:
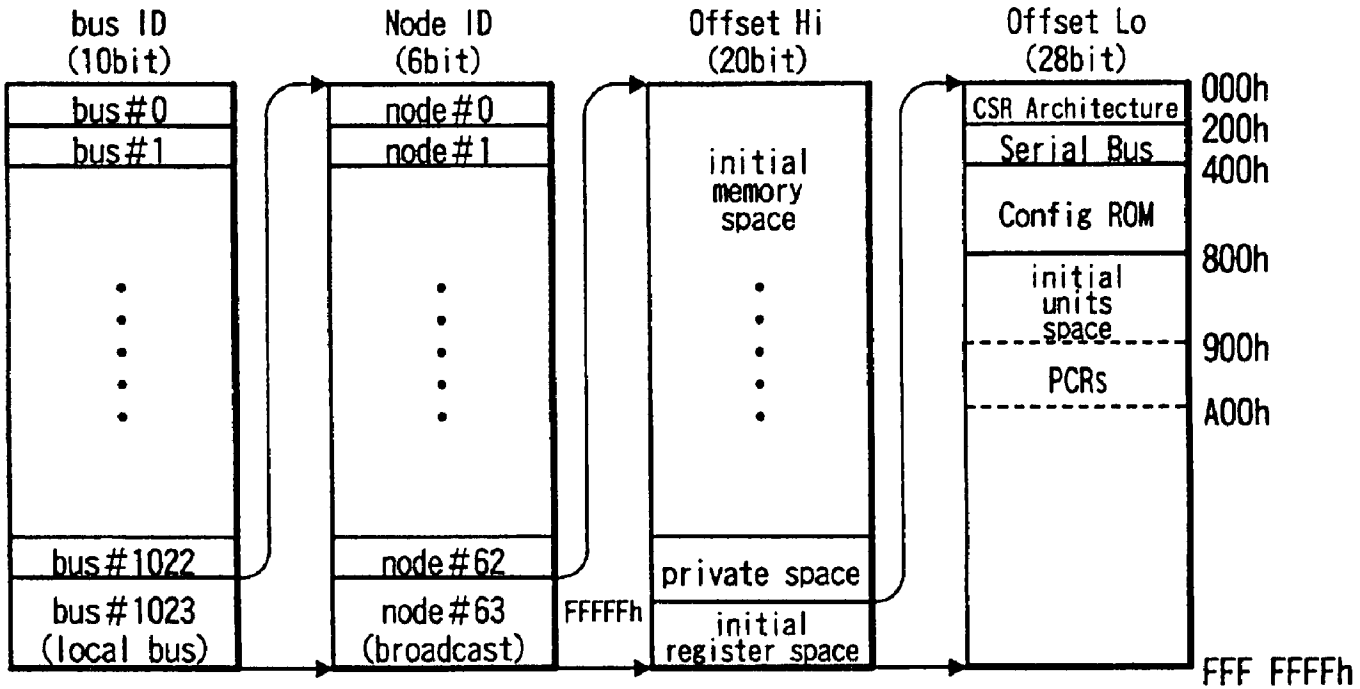
FIG. 4 illustrates an address space structure of CSR architecture.

The IEEE 1394 is based upon CSR(Control & Status Register) architecture having an address space of sixty-four bits defined by ISO/IEC 13213. FIG. 4 illustrates a structure of the address space in accordance with the CSR architecture. High order sixteen bits form a node ID indicating each electronic equipment on the IEEE 13 94. Remaining forty-eight bits are used for specifying the address space given each electronic equipment. These high order sixteen bits are further divided into ten bits of bus ID and six bits of physical ID (node ID in a narrow sense). They can specify a thousand and twenty-three buses and sixty-three electronic equipments because a value in which all bits become one is used for a special purpose.

A space defined by high order twenty bits of the address space of two hundreds and fifty-six terabytes defined by low order forty-eight bits are divided into an Initial Register Space used for a register of two thousand and forty-eight bytes unique to CSR, a register unique to the IEEE 1394 and the like, Private Space and initial Memory Space. A space defined by low order twenty-eight bits is, if a space defined by its high order twenty bits is initial Register Space, used as Configuration Read Only Memory, an initial Unit Space used for special purpose unique to an electronic equipment, Plug Control Register (PCRS) and the like.

While each electronic equipment has the CSR shown in FIG. 4, as concerns a bandwidth available register, only those contained by the isochronous resource manager are valid. In other words, the bandwidth available register is substantially included in only the isochronous resource manager.

When a bandwidth is not allocated in the isochronous communication, the maximum value is preserved in the bandwidth available register, and whenever a bandwidth is allocated, its value decreases.

Each bit of channels available register between offset 224h and 228h corresponds to channel no. zero to 63, respectively. If the bit is equal to zero, it is indicated that channel has already been allocated. Only the channels available register of an electronic equipment operating as the isochronous resource manager is valid.

In order to control input and output of each equipment through an interface, an electronic equipment has PCR (Plug Control Register) defined by IEC 61883 in addresses 900 h to 9FFh within initial Unit Space shown in. FIG. 4. This is such that a concept of plug is substantiated so as to form signal paths logically similar to an analog interface FIG. 5 illustrates the structure of PCR. the PCR has oPCR (output Plug Control Register) representing an output plug and iPCR (input Plug Control Register) representing an input plug. Moreover, the PCR has oMPR (output Master Plug Register) and iMPR (input Master Plug Register) indicative of information on output plug or input plug unique to each equipment. Each equipment does not have a plurality of oMPR and iMPR, but is able to have a plurality of oPCR and iPCR corresponding to each individual plug. The PCR shown in FIG. 5 has thirty-one oPCR and iPCR, respectively. A flow of isochronous data is controlled by operating the register corresponding to these plugs.

Figures 6A, 6B, 6C, 6D:
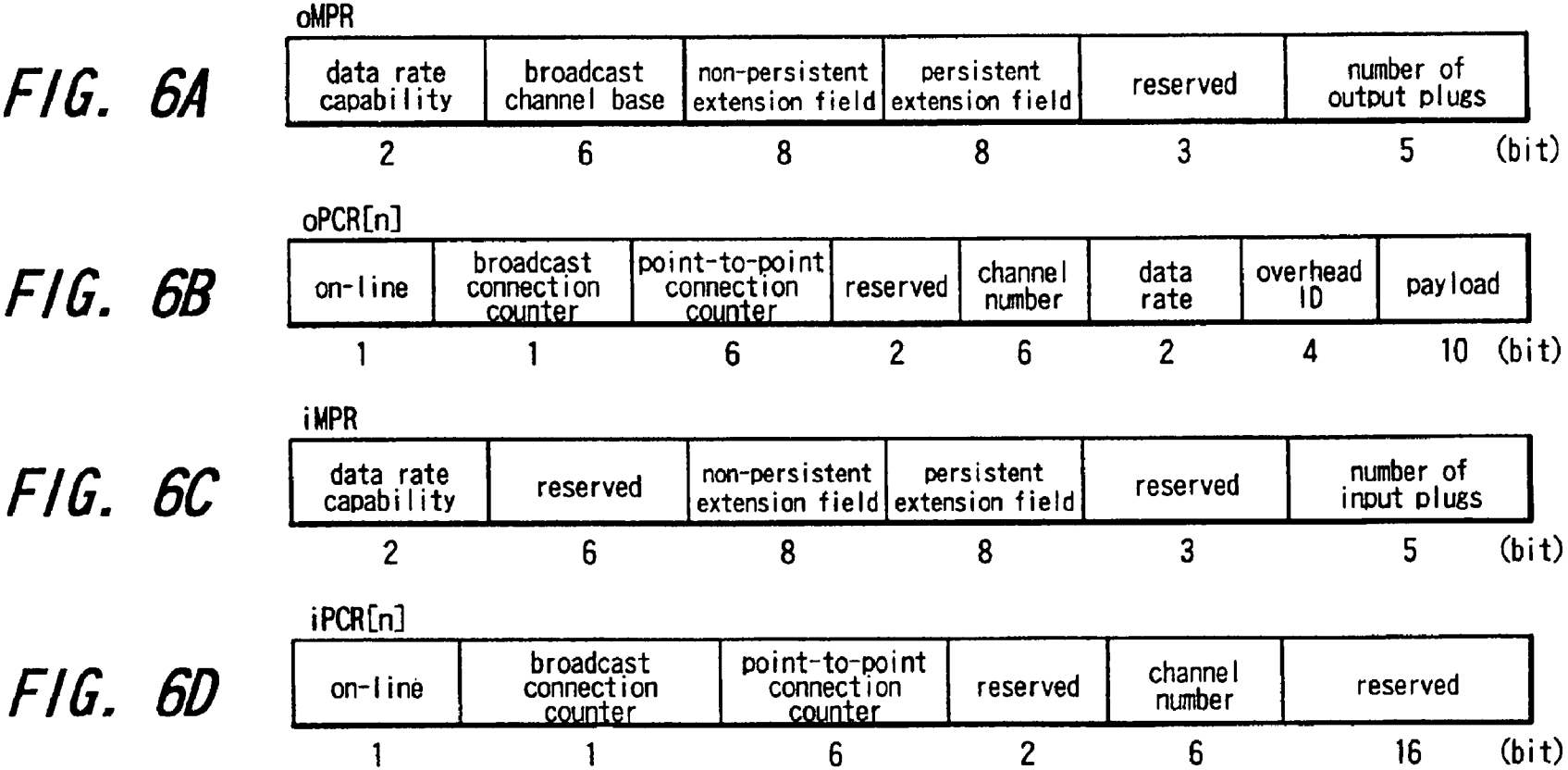
FIGS. 6(A) to 6(D) show structures of oMPR, oPCR, iMPR and iPCR, respectively.

FIGS. 6 (A) to (D) show structures of oMPR, oPCR, iMPR and iPCR: FIG. 6 (A) shows the structure of oMPR; FIG. 6(B) shows the structure of oPCR; FIG. 6(C) shows the structure of iMPR; FIG. 6(D) shows the structure of iPCR, respectively. An area of data rate capability of two bits on the side of MSB of oMPR and iMPR stores a code indicating the maximum transmission speed of isochronous data which can be transmitted or received by that equipment. An area of broadcast channel base of oMPR prescribes the channel number used for broadcast output.

An area of number of output plugs of five bits on the side of LSB of oMPR stores a value indicating the number of output plugs owned by the relevant equipment, namely, the number of oPCR. An area of number of input plugs of five bits on the side of LSB of iMPR stores a value indicating the number of input plugs owned by the relevant equipment, namely, the number of iPCR. Areas of non-persistent extension field and persistent extension field are those defined for future extension.

Each area of on-line of MSB in oPCR and iPCR shows a state of use of the plug. In other words, its value of one shows that the plug is on-line and its value of zero shows that the plug is off-line. A value of each broadcast connection counter of oPCR and iPCR indicated whether the broadcast connection is present (1) or not (0). A value of each point-to-point connection counter being six bits wide of oPCR and iPCR indicates the number of point-to-point connection owned by the relevant plug. A value of each channel number six bits wide of oPCR and iPCR indicates the isochronous channel number to which the relevant plug is connected. A value of data rate two bits wide of oPCR indicates an actual transmission speed of isochronous data packet output by the relevant plug. A code stored in an area of overhead ID four bits wide of oPCR represents a bandwidth of overhead of isochronous communication. A value of payload ten bits wide of oPCR represents the maximum value of data contained in isochronous packet, in which the relevant plug can handle.

Figure 7:
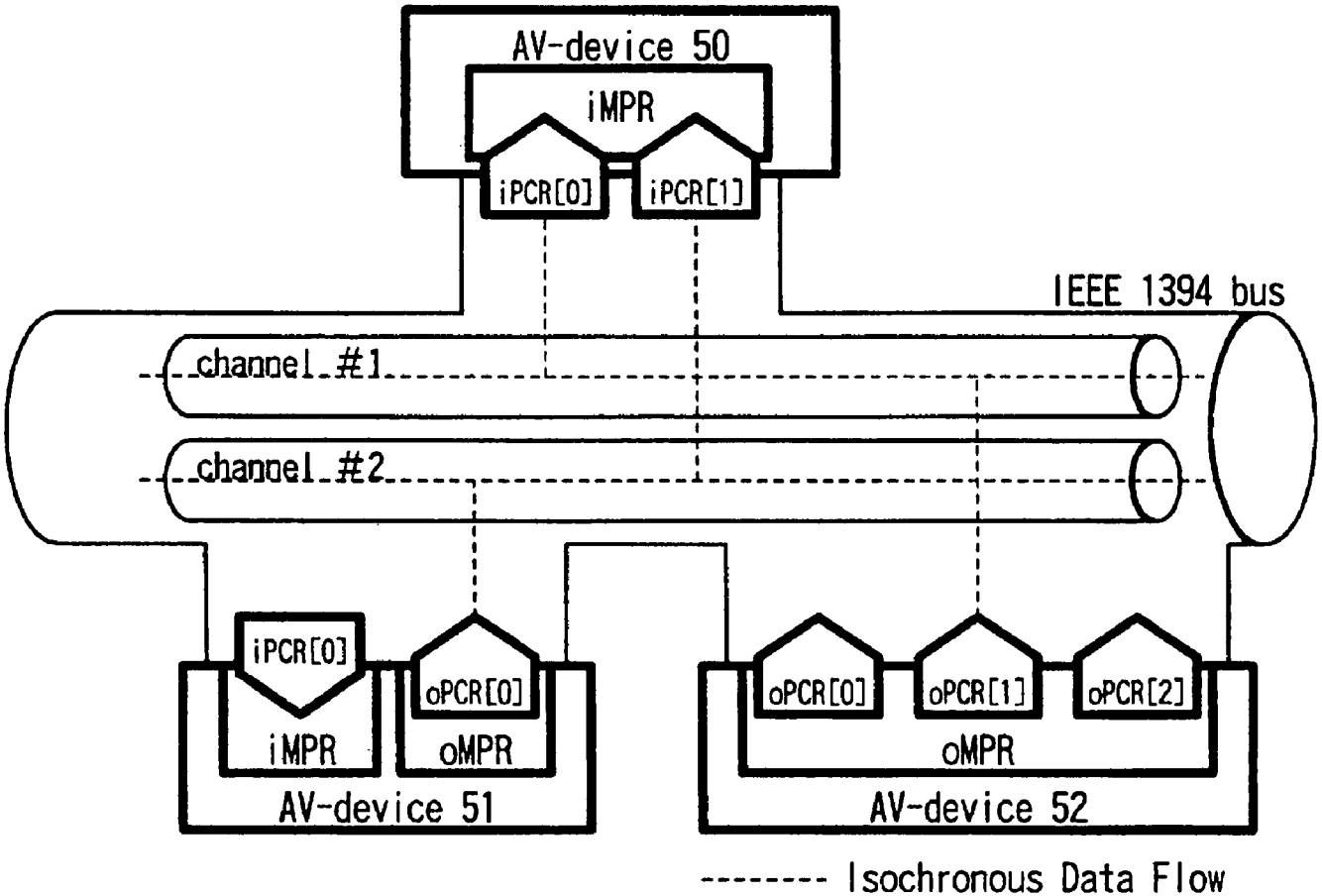
FIG. 7 represents a relation between plugs, plug control registers and isochronous channels.

FIG. 7 shows a relation between the plug, the plug control register-and the isochronous channel. AV-devices 50 to 52 are connected to each other by means of the IEEE 1394 serial bus. The isochronous data whose channel is specified by oPCR [1], of oPCR [0] to oPCR [2] whose transmission speed and number of oPCRs by oMPR of AV-device 52 are defined, is sent out to channel no. 1 of the IEEE 1394 serial bus. AV-device 50 reads and stores the isochronous data sent out to the channel no. 1 of the IEEE 1394 serial bus. Likewise, AV-device 51 sends out isochronous data to channel no. 2 specified by oPCR [0], and AV-device 50 reads the isochronous data from the channel no. 2 specified by iPCR [1] and stores it.

Next, AV/C command set employed in the audio system shown in FIG. 1 will be described with reference to FIG. 8 to FIG. 9.

Figure 8:
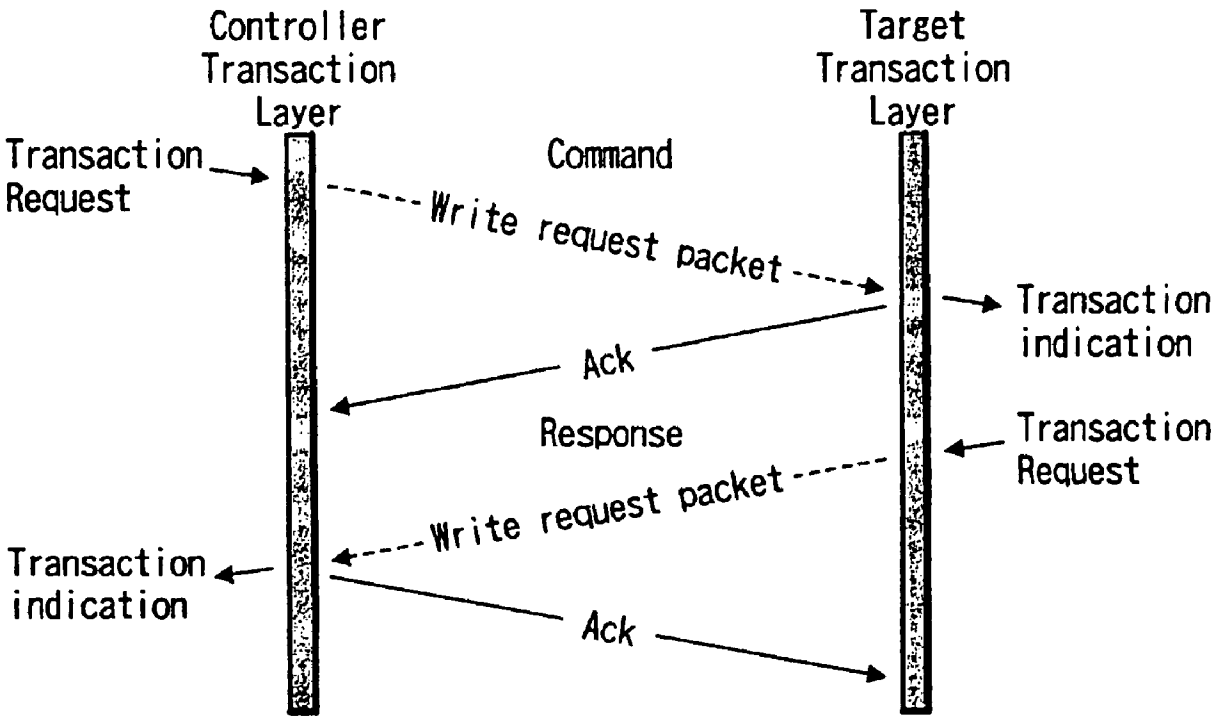
FIG. 8 illustrates a relation between control command and its response.

FIG. 8 illustrates the control command and the response transmitted asynchronously. As shown in FIG. 8, the controlling side is indicated as controller and the controlled side is indicated as target. Transmission or its response of the control command is performed between electronic equipments using Write Transaction of asynchronous transmission in IEEE 1394. The target which receives data returns acknowledgement (ACK) to the controller for confirming the reception.

Figure 9:
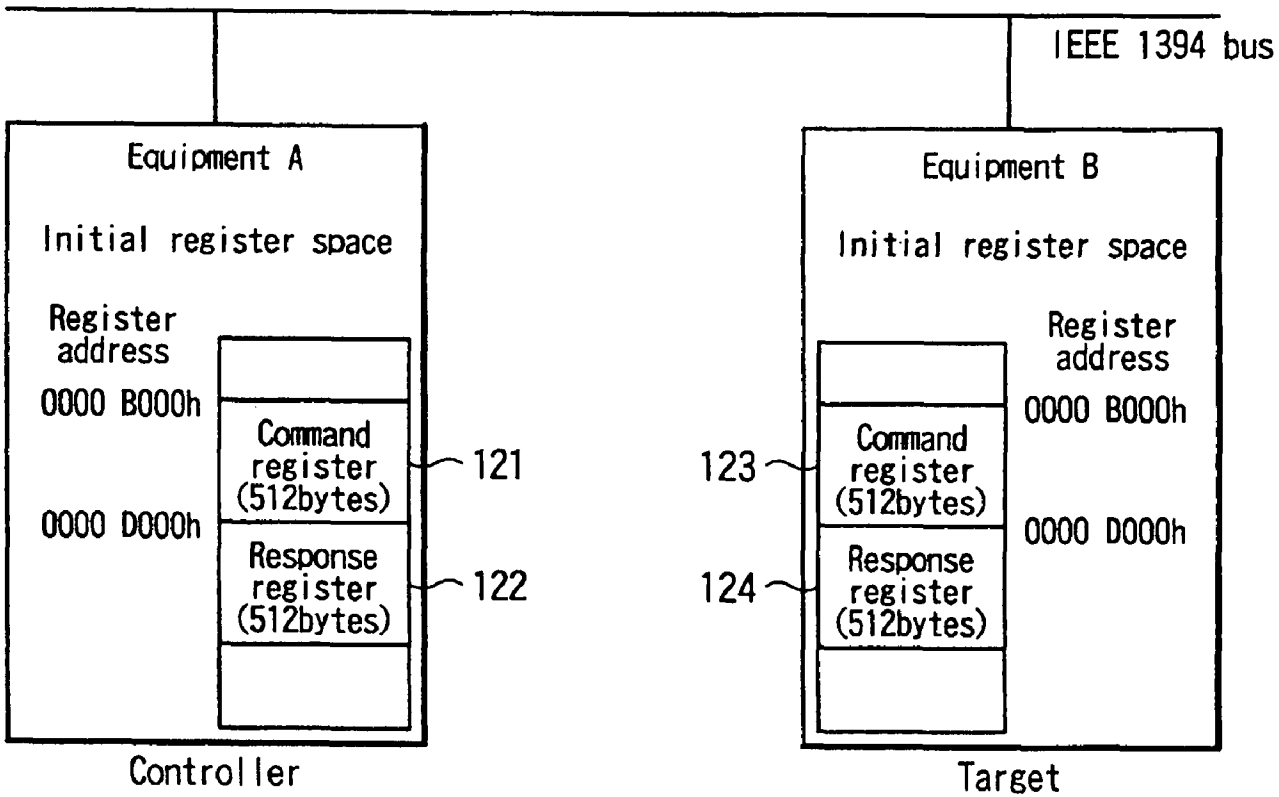
FIG. 9 illustrates the relation between the command and response of FIG. 8 in more detail.

FIG. 9 illustrates in more detail the relation between the control command and the response shown in FIG. 8. An electronic equipment A is connected with an electronic equipment B through the IEEE 1394 bus. The electronic equipment A is the controller and the electronic equipment B is the target. The electronic equipment A and the electronic equipment B both have a command register and a response register each of which has 512 bytes, respectively. As shown in FIG. 9, the controller communicates the command by writing a command message into the command register 123 of the target. Inversely, the target communicates the response by writing a response message into the response register 122 of the controller. The control information is thus exchanged by the two messages made a pair.

Figure 10:
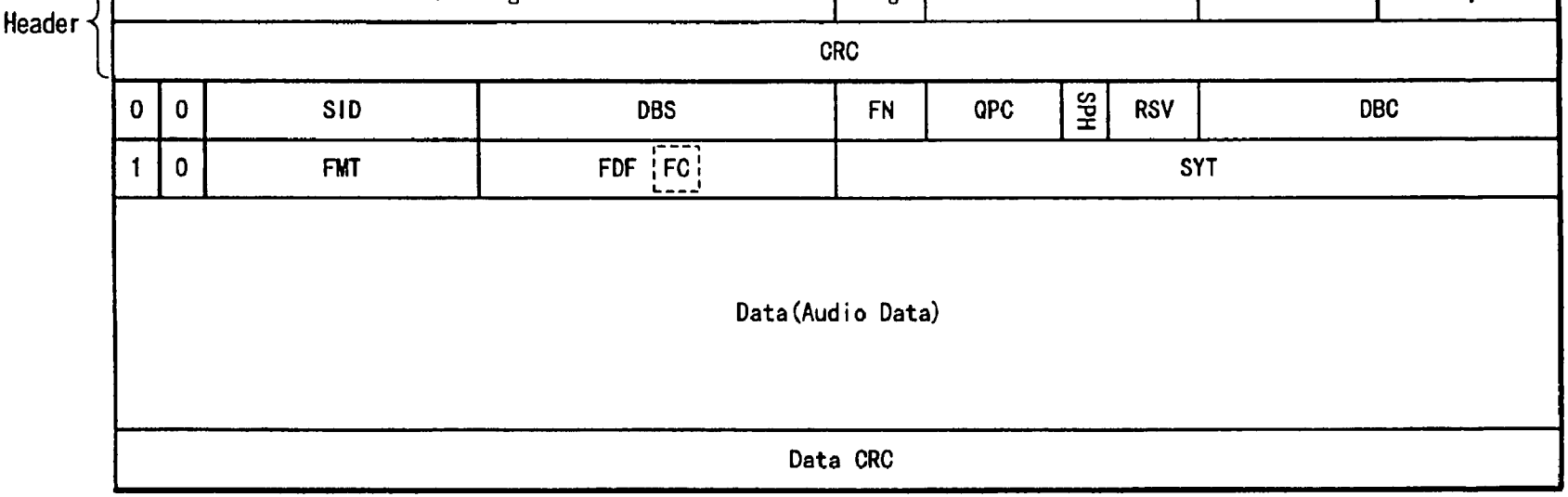
FIG. 10 illustrates an example of the packet structure (an example of isochronous transfer packet) applied to a mode for carrying out the present invention.

FIG. 10 is a diagram showing a part of the isochronous transfer packet used for the aforesaid isochronous transfer. A header is assigned to this packet, which occupies 32×2 bits from front and includes synchronizing pattern sy, packet code tcode, channel, tag, data length and error correction code CRC. To the subsequent 32 bits are assigned count value of successive packets DBC when data of a fixed size are divided to be assigned to each packet, Reserve RSV, Marker SPH indicating whether there is a source packet header or not, Divisional number of source packet FN, Data block size DBS, Identification code of its own SID and so on. To the further subsequent 32 bits are assigned Recording area SYT such as a time stamp, Sampling frequency FDF of transmitted data, Transmission format FMT and so on. To the still further subsequent area is assigned the transmitted data made of source data with 32 bits as a unit, and their error correction code CRC is added to its end.

Additionally, in the present example, one bit at a specific position in the area of Sampling frequency FDF made of eight bits (one bit at a position surrounded by a broken line in FIG. 10) is used for adding a flag FC indicating that the transmission rate of audio signal is being controlled. If this flag FC is "1" signal, it indicates that a mode in which the transmission rate is controlled is entered. If the flag FC is "0" signal, it indicates that a mode in which the transmission rate is not controlled is entered. Further, in the following description, a mode in which the transmission rate is controlled will be referred to a flow control mode.

The audio link block 9 adds the digital audio signal DA to this isochronous transfer packet by a fixed unit and sends it out through the input-output circuit 10.

Figure 11:
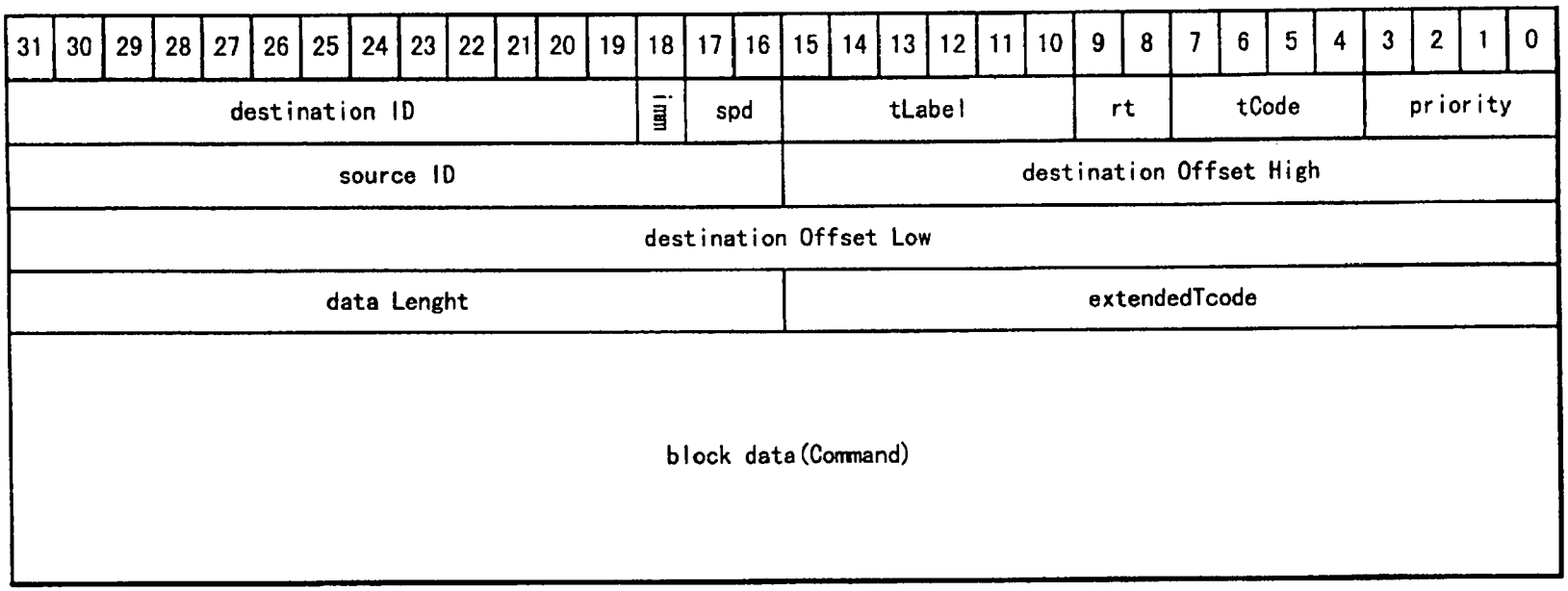
FIG. 11 illustrates an example of the packet structure (an example of asynchronous transfer packet) applied to a mode for carrying out the present invention.

FIG. 11 is a diagram showing the asynchronous transfer packet being the packet for asynchronous communication by one-to-one of the aforesaid control command and the like. The input-output circuit 10 sets the address, etc. indicating its own node and bus number or the like on the packet for sending it out. Specifically, to 32 bits from the front of the packet are assigned Priority level of this packet (priority), Code of this packet (Code t), Retry code of this packet (rt), Label assigned to this packet (Label t), Transmission speed (spd) and Identification data indicating the relation with successive packets (imm). Moreover, data specifying an address of destination node (destination Offset High, destination Offset Low) and data indicating the destination node and bus (destination ID) are assigned. Subsequently, Data length of the transmission data (data Length), etc. are further assigned and then the transmission data is assigned with 32 bits as a unit.

The audio link block 9 receives the packet for one-to-one communication received by the input-output circuit 10 and notifies the data assigned to this packet to the host computer 6. In this way, various kinds of control commands transmitted from the disk recording/playback unit 3 to the compact disk playback unit 2 are notified to the host computer 6.

The host computer 6 is comprised of a computer which controls the overall operation of compact disk playback unit 2, and controls the operation of digital signal processor 5 in response to an operation of operating elements arranged on an operating panel of the compact disk playback unit 2 to play back the optical disk 7.

In the playback of optical disk 7, when the reproduced digital audio signal DA is transmitted to-the disk recording/playback unit 3, the host computer 6 receives the control command sent out of the disk recording/playback unit 3 through the audio link block 9 and controls the playback operation of compact disk 7 in accordance with the control command. In other words, when the host computer 6 receives the control command to finely adjust a reproduction rate from the disk recording/playback unit 3, it instructs the digital signal processor 5 so as to turn the playback conditions of compact disk 7 into the corresponding conditions. Also, when the host computer 6 receives from the disk recording/playback unit 3 the control command to switch the playback speed, it instructs the digital signal processor 5 to switch the playback speed in accordance with this command. In this manner, it is arranged that the compact disk playback unit 2 sends out the digital audio signal DA in the form of a variable amount of data per unit time under the control of disk recording/playback unit 3.

An input-output circuit 11 in the disk recording/playback unit 3 watches packets transmitted over the bus lines B1, B2, in the same way as the input-output circuit 10 in the compact disk playback unit 2 and acquires the packet necessary for the disk recording/playback unit 3. The input-output circuit 11 further reproduces the acquired packet and notifies it to an audio link block 12. On this occasion, the input-output circuit 11 detects data transmitted from the bus lines B1, B2 Synchronously with a predetermined clock signal to reproduce each data within the transmitted packet.

In this case, when receiving the isochronous transfer packet which transmits the audio data, if the reception is made in the transmission mode which is not the aforesaid flow control mode, the processing to reproduce is made in synchronism with the transmitted audio data with reference to the time stamp arranged in the recording area SYT. However, in the case of flow control mode, the reproduction is made without reference to the time stamp arranged in the recording area SYT. In other words, the detection is made synchronously with the clock signal produced by a clock generator circuit within the disk recording/playback unit 3 to reproduce the transmitted packet. However, even in the case of flow control mode, if the synchronous processing can be made with reference to the time stamp, the reproduction using the time stamp may be carried out.

An audio link block 12 acquires a packet from the input-output circuit 11 and stores the digital audio signal DA assigned to this packet in the recording area of digital audio signal DA arranged in a memory 13. Also, the audio link block 12 outputs the digital audio signal DA retained in the memory 13 to a digital signal processor 14 or a digital-to-analog converter (D/A) 16 and stops the readout of digital audio signal DA from the memory 13 under the control of a host computer 15.

In a sequence of these processings, the audio link block 12 records the digital audio signal DA in the memory 13 with reference to the clock signal WCK superposed on input data, synchronized with the clock signal WCK of the compact disk playback unit 2, and then reads it out based on a clock signal RCK output from the digital signal processor 14 for outputting.

A recording block 18 is composed of a driving mechanism for driving to rotate the disk and a recording/reproducing system such as the optical pickup, and forms a mark sequentially on the magneto-optical disk depending on recording signals output from the digital signal processor 14.

The digital signal processor 14 controls the operation of recording block 18 and also produces the recording signal depending on the digital audio signal DA output from the audio link block 12 for outputting. In the disk recording/playback unit 3, the digital audio signal DA is recorded on the disk by means of the digital signal processor 14 and the recording block 18.

On this occasion, the digital signal processor 14 produces the clock signal RCK by a built-in quartz oscillator 19, which is asychronous with the clock signal WCK of the compact disk playback unit 2 and besides of high accuracy, and processes the digital audio signal DA output from the audio link block 12 with reference to the clock signal RCK. It also outputs this clock signal RCK to the recording block 18, the digital-to-analog converter 16 and the audio link block 12.

The digital-to-analog converter 16 is what is called a one bit digital-to-analog converter which converts the digital audio signal DA to an analog signal according to PWM modulation method. It can also produce an audio signal converted to the analog signal in order to drive a speaker 4 connected to the disk recording/payback unit.

The host computer 15 is comprised of a computer which controls the overall operation of disk recording/playback unit 3, and controls the operation of digital signal processor 14, etc. in response to an operation of operating elements arranged on an operating panel of the disk recording/playback unit 3, thereby causing the digital audio signal DA to be recorded on the disk or to be output from the speaker 4.

In this processing of digital audio signal DA, when processing the digital audio signal DA transmitted from the compact disk playback unit 2, the host computer 15 produces the control command to the compact disk playback unit 2 depending on an amount of data of the digital audio signal DA retained in the memory 13. It performs the flow control processing using this command, in which an amount of data of the digital audio signal DA per unit time sent out from the compact disk playback unit 2 is variably controlled in dependence on the amount of data of digital audio signal DA retained in the memory 13. The flow control processing will be described below in detail.

Figures 12, 13:
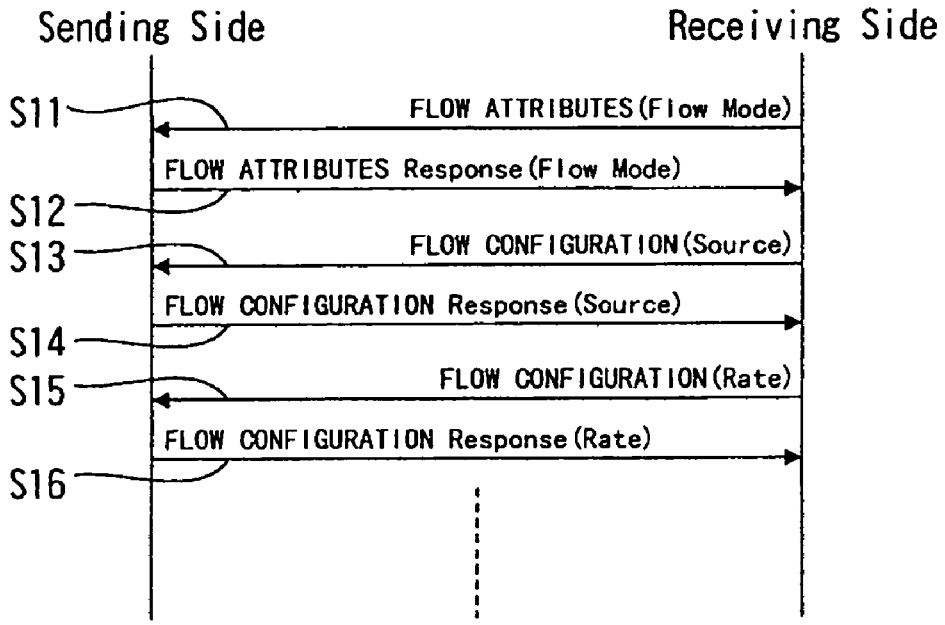
FIG. 12 illustrates an example of the control sequence of transmission processing (an example in which settings are made from the receiving side) applied to a mode for carrying out the present invention.
FIG. 13 illustrates the kinds of commands applied to a mode for carrying out the present invention.

Next, an example of transmission processing when transmitting the audio signal reproduced by the compact disk playback unit 2 to the disk recording/playback unit 3 for processing to record it on the disk (magneto-optical disk) in the disk recording/playback unit 3 will be described. In addition, to make the description simple, the compact disk playback unit 2 is hereinafter referred to merely as a playback unit 2 and the disk recording/playback unit 3 is referred to merely as a recording unit 3. FIG. 12 shows a control sequence in this case. An example is herein shown, in which the side of recording unit 3 being a receiving side of the audio signal transmitted over the bus line controls the transmission. Further, in the case of this example, two kinds of commands for processing to transmit are prepared, as shown in FIG. 13, namely, a transmission setting command for setting transmission conditions (FLOW CONFIGURATION) and a transmission attributes command for examining transmission attributes (FLOW ATTRIBUTES). The transmission setting command includes control data and status data. The transmission attributes command includes only status data. These commands are produced by the host computer, etc. of each unit and sent out in the form of packets whose format is defined by the input-output section connected to the bus line. These packets for transmitting the commands are all the packets in the asynchronous transfer mode.

Describing below referring to FIG. 12, the recording unit 3 transmits first the transmission attributes command S11 for examining the flow control mode to the playback unit 2. FIG. 14 shows an example of data structure of the transmission attributes command in this case, in which are arranged a code of FLOW ATTRIBUTES indicating that it is the transmission attributes command, a code of FLOW Mode indicating that it examines the transmission mode and so on.

When the playback unit 2 receives this command S11, it transmits data on the reproduction mode which is possible with the playback unit 2 to the recording unit 3 as the transmission attributes command of response S12. FIG. 15 shows an example of data structure of the transmission attributes command of response in this case, in which data of FLOW Mode attributes [0] to [7] indicate whether or not the respective modes previously prepared for a standard are supported by the playback unit 2.

FIG. 16 shows the details of modes prepared in the case of this example. For example, a mode indicated by the first bit is a locked normal mode at one-fold speed of playback speed; a mode indicated by the second bit is an unlocked flow control mode at one-fold speed of playback speed; a mode indicated by the third bit is a locked flow control mode at one-fold speed of playback speed; a mode indicated by the fourth bit is a locked flow control mode at four-fold speed of playback speed; a mode indicated by the fifth bit is a locked flow control mode at eight-fold speed of playback speed; a mode indicated by the sixth bit is a locked flow control mode at sixteen-fold speed of playback speed. For example, "1" signal in any of the respective bit positions indicates the supported mode (i.e. mode transmissible by the playback unit 2) and "0" signal indicates non-supported mode (i.e. mode not transmissible by the playback unit 2). In addition, although an unlocked mode at one-fold speed of playback speed is also prepared as a normal mode not shown by these data, this mode is the always supported mode and so it is not indicated in the command.

Describing here the difference between locked mode and unlocked mode, the locked mode is such that, when the mode is set, that mode is locked. Unlocking of that mode is made possible only by an equipment specifying that mode. The unlocked mode is such that this sort of locking is not carried out. Thus, changing this mode is possible by any equipment. However, in the case of this example, a limitation is imposed on changing the mode. Details of the limitation will be described below.

Returning to the description with FIG. 12, because the recording unit 3 receives the attributes command of response, the side of recording unit 3 can estimate modes which can be sent out of the playback unit 2. The recording unit 3 selects the mode of transmission to be performed among the estimated modes. This selection may be made, for example, by user's key operation at the recording unit 3 or by automatically setting a mode which enables the fastest and satisfactory recording.

Data of the selected mode is transmitted as the transmission setting command S13 from the recording unit 3 to the playback unit 2. FIG. 17 shows an example of this transmission setting command S13. This includes a code of transmission setting command (FLOW CONFIGURATION) and a code of source (Source) being data on the selected mode. Also, data on a flow mode are added. Examples of transmission modes indicated by the source code are shown in FIG. 18. For example, a code "0 0" indicates an unlocked mode at one-fold speed of playback speed; a code "0 1" indicates a locked mode at one-fold speed of playback speed; a code "0 2" indicates an unlocked flow control mode at one-fold speed of playback speed; a code "0 3" indicates a locked flow control mode at two-fold speed of playback speed; a code "0 4" indicates a locked flow control mode at four-fold speed of playback speed; a code "0 5" indicates a locked flow control mode at eight-fold speed of playback speed; a code "0 6" indicates a locked flow control mode at sixteen-fold speed of playback speed.

For data of the flow mode, as shown in FIG. 20 for example, a code "AA" indicates data specifying a standard rate; a code "BB" indicates data specifying a rate somewhat higher than the standard rate; a code "CC" indicates data specifying a rate somewhat lower than the standard rate. Additionally, in an initial state, the standard rate is specified basically.

When the playback unit 2 receives the transmission setting command S13, it transmits to the recording unit 3 a response command S14 to that command. The playback unit 2 then reproduces the audio signal from the optical disk 7 at a playback speed corresponding to the mode specified by that command and transmits the reproduced audio signal on the isochronous transfer packets to the recording unit 3.

In this transmission, if a need to finely adjust the reproduction rate in the playback unit 2 arises, the recording unit 3 transmits a transmission setting command S15 for rate control. When the playback unit 2 receives this transmission setting command S15, it transmits to the recording unit 3 a response command S16 to that command and also adjusts the reproduction rate finely to a state specified by that command. FIG. 19 shows an example of the transmission setting command for the rate control, to which the codes for specifying rates shown in FIG. 20 are added for transmission.

Figure 21:
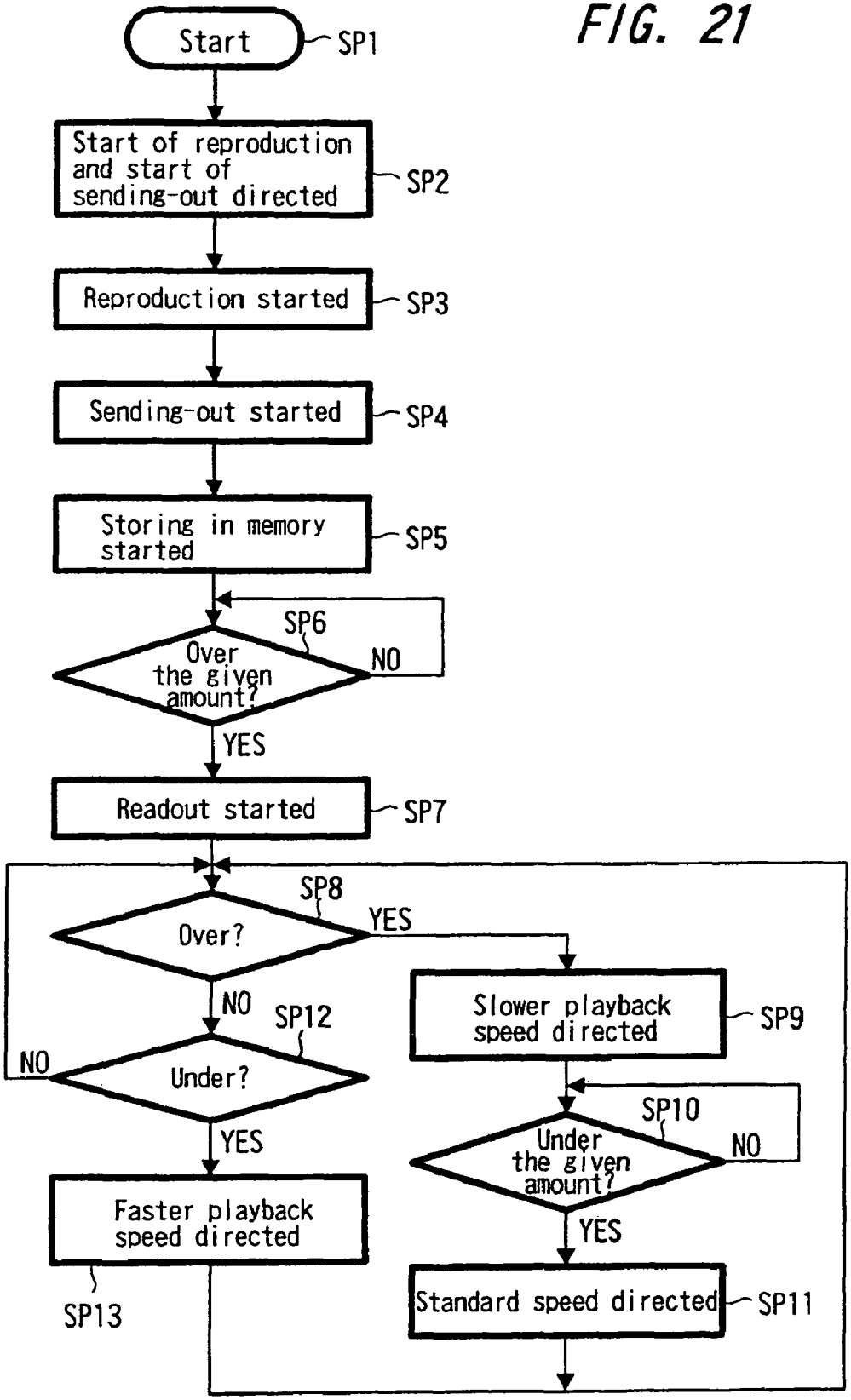
FIG. 21 is a flow chart showing an example of the rate control according to a mode for carrying out the present invention.

In this context, a flow in which the rate control takes place will be described. FIG. 21 is a flow chart showing the sequence in which the rate control takes place. When directed to start the reproduction, the host computer 15 of the recording unit 3 moves from a step SP1 to a step SP2 to produce a control command directing the playback unit 2 through the audio link block 12 and the input-output circuit 11 to start the reproduction and start sending-out of the digital audio signal DA.

Thus, as shown subsequently at a step SP3, the host computer 6 of the playback unit 2 which has received this control command starts playing-back of the disk 7 and sends out, at the following step SP4, the reproduced digital audio signal DA from the playback unit 2.

The host computer 15 sets the operation of audio link block 12, at the next step SP5, to store in the memory 13 the digital audio signal DA sent out of the playback unit 2 and then moves to a step SP6. The host computer 15 measures here whether or not a predetermined amount or more of the digital audio signal DA has been stored in the memory 13 and if a negative result is given, it will repeat the step SP6.

In this connection, when the amount of data of digital audio signal DA occupies approximately half of an area of the memory 13 assigned for storing the digital audio signal DA, the host computer 15 decides at this step SP6 that a predetermined or more value of the data amount has been stored and moves to a step SP7.

At this step, the host computer 15 directs the audio link block 12 to start the readout of digital audio signal DA from the memory 13. In this way, the host computer 15 controls the overall operation so as to start the processing to read out the digital audio signal DA reproduced and transmitted by the playback unit 2 in accordance with the more accurate clock signal RCK asynchronous with the clock signal WCK of the playback unit 2.

On directing the start of operation in this manner, the host computer 15 moves to a step SP8 and measures whether or not the memory 13 is just before an overflow. In this regard, when a frequency of the clock signal RCK of disk recording/playback unit 3 is slightly lower than that of the clock signal WCK of playback unit 2, the-data amount of digital audio signal DA read out of the memory 13 is less than that of digital audio signal DA sent out of the compact disk playback unit 2 and stored in the memory 13 accordingly. Thus, the data amount of digital audio signal DA stored by degrees in the memory 13 will increase until the memory 13 overflows, which makes it difficult to process the digital audio signal DA continuously.

When a vacant storing space of the memory 13 becomes less than a data amount Δ1 corresponding to a delay time from when the compact disk playback unit 2 is directed to stop reproducing and sending out the digital audio signal DA to when the sending out the digital audio signal DA is actually stopped, the host computer 15 decides at this step SP8 that it is in the over conditions and moves to a step SP9 for transmitting the rate control command to make the rate slower to the side of playback unit 2.

The host computer 15 moves subsequently to a step SP10 and measures whether or not the data amount of digital audio signal DA stored in the memory 13 becomes less than the data amount whose readout was started at the step SP7 and if a negative result is given, it will repeat the step SP10.

In this way, the host computer 15 waits until the data amount stored in the memory 13 becomes under the given value and when it becomes under the given value, a positive result will be given at the step SP10. Thus, the computer moves to a step SP11 for transmitting to the side of playback unit 2 the rate control command to return the rate to the standard.

Again, if a negative result is given at the step[SP8, the host computer 15 moves to a step SP12 and measures here whether or not the data amount stored in the memory 13 is just before the under conditions.

In this connection, when the frequency of clock signal RCK of disk recording/playback unit 3 is slightly higher than that of clock signal WCK of the compact disk playback unit 2, the data amount of digital audio signal DA read out of the memory 13 is more than that of digital audio signal DA sent out of the compact disk playback unit 2 and stored in the memory 13 accordingly. Thus, the data amount of digital audio signal DA stored by degrees in the memory 13 will decrease until the digital audio signal DA is interrupted, which makes it difficult to process the digital audio signal DA continuously.

Therefore, if it decides to be just before the under conditions, it moves to a step SP13 and transmits to the side of playback unit 2 the rate control command to make the rate faster. This prevents the digital audio signal DA from being interrupted.

Moreover, because the memory 13 stores a moderate amount of data of the digital audio signal DA, the host computer 15 will obtain the negative result at the step SP12 and return to the step SP8.

Figure 22:
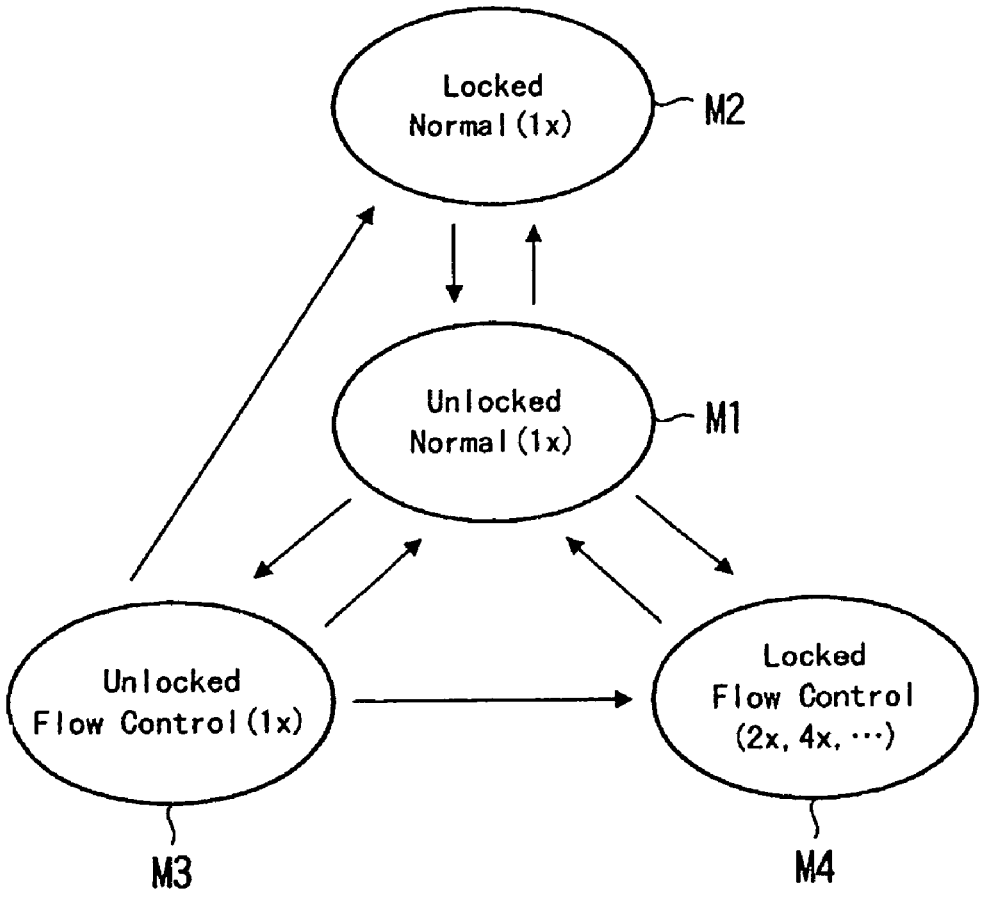
FIG. 22 illustrates example of the transition between modes according to a mode for carrying out the present invention.

Furthermore, in the case of this example, a limitation is imposed on the transition between respective modes shown in FIG. 16 and FIG. 18. FIG. 22 shows the limits in which the modes can vary. The unlocked normal mode of one-fold speed M1 being the normal mode can change into any mode. The locked normal mode of one-fold speed M2 can only return to the unlocked normal mode of one-fold speed M1. The unlocked flow control mode of one-fold speed M3 can change into the unlocked normal mode of one-fold speed M1, the locked normal mode of one-fold speed M2 and the locked flow control mode of two-fold or more speed M4. The locked flow control mode of two-fold or more speed M4 can only change into the unlocked normal mode M1.

According to the above described structure, because the compact disk playback unit 2 sends out the digital audio signal in the form of variable amount of data per unit time under the control of the disk recording/playback unit 3 being the receiving side, it is possible to process the digital audio signal continuously and avoid effectively the deterioration of sound quality due to the jitters.

Moreover, because the disk recording/playback unit 3 processes to store the received digital audio signal in a buffer and controls to vary the data amount of digital audio signal per unit time, which is sent out of the compact disk playback unit 2 being an external equipment, depending on the data amount of digital audio signal retained in the buffer, it is possible to process the digital audio signal continuously and avoid effectively the deterioration of sound quality due to the jitters.

Furthermore, by transmitting these digital audio signals in the form of packets, it is possible to transmit and receive the control command and the digital audio signal by simple control for enabling these controls to be implemented.

Figure 23:
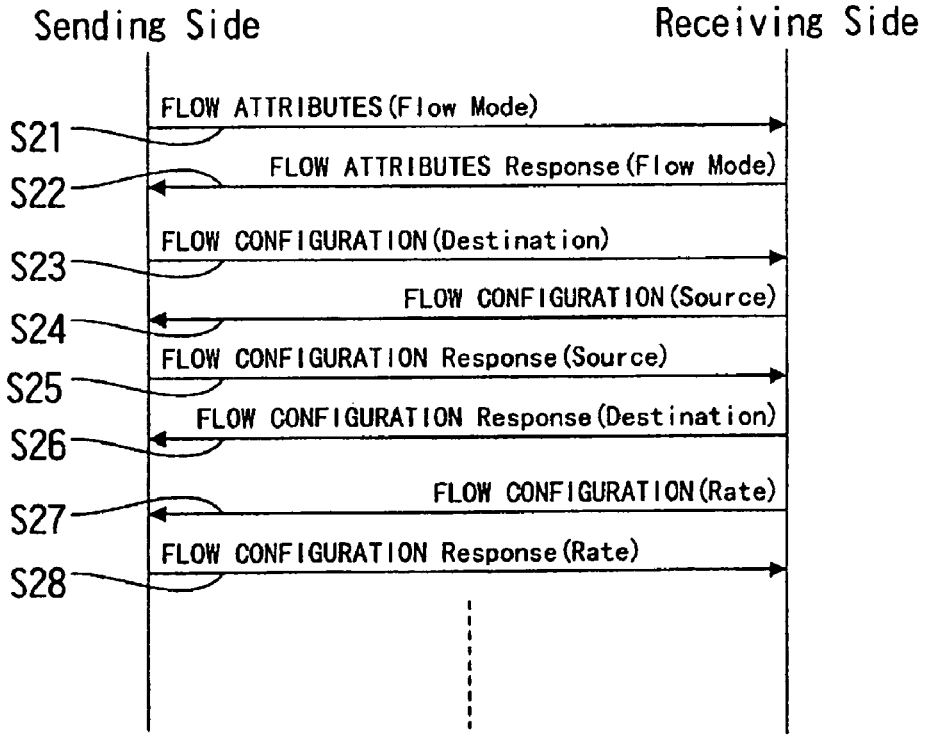
FIG. 23 illustrates an example of the control sequence of transmission processing (an example in which settings are made from the sending side) applied to another mode for carrying out the present invention.

In addition, although the aforesaid embodiment is arranged to set the transmission mode under the control of the recording unit 3 being the receiving side, it may be arranged that the transmission mode is set under the control of the playback unit 2 being the sending side. FIG. 23 shows a control sequence in this case. Describing below its processings, the playback unit 2 transmits first the transmission attributes command S21 for examining the flow control mode to the recording unit 3. The recording unit 3 transmits the transmission attributes command S22 being a response to the above transmission to the playback unit 2. When the playback unit 2 receives this command, it transmits a command S23 for specifying the destination to the recording unit. In response to this, the recording unit 3 transmits the transmission attributes command S24 for specifying the mode. The playback unit 2 transmits a command S25 being a response to the transmission attributes command S24. Further, the recording unit 3 transmits a command S26 being its response.

In this transmission, when the playback unit 2 need adjust the reproduction rate finely, the recording unit 3 transmits to the playback unit 2 the transmission setting command S27 for the rate control. When the playback unit 2 receives this transmission setting command S27, it transmits to the recording unit 3 a response command S28 to that command and also adjusts the reproduction rate precisely to such conditions as specified by that command.

By processing in this manner, it will also be possible to implement the transmission under the control of the side of playback unit.

Figure 24:
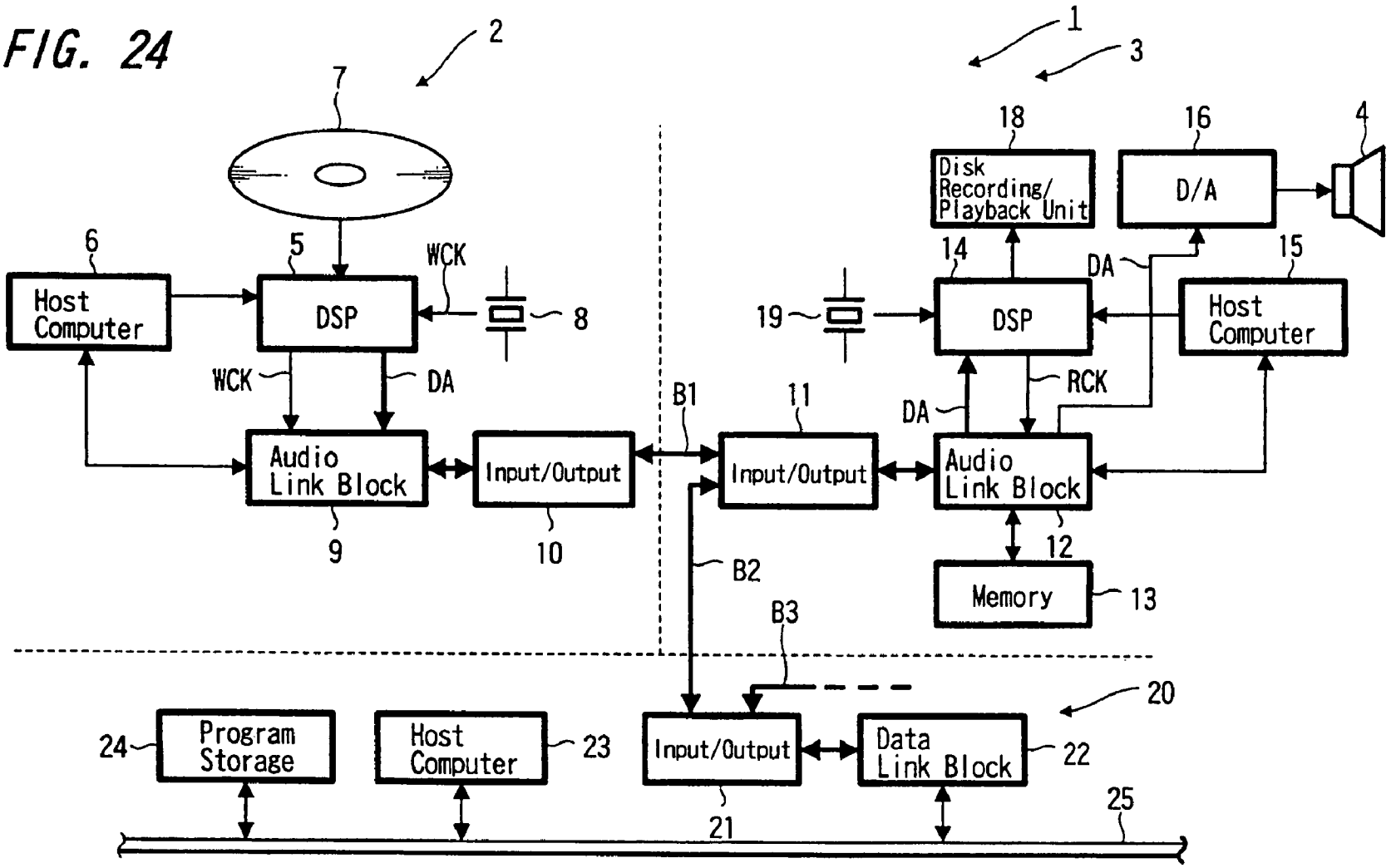
FIG. 24 is a block diagram showing an example of the audio system (an example in which another control terminal exists) according to another mode for carrying out the present invention.

Moreover, any equipment other than the recording unit and the playback unit may be connected to the bus line so as to carry out the transmission under the control of that equipment. FIG. 24 shows an example of the connection structure in this case. This is such a case that the disk recording/playback unit 3 is connected to a computer unit 20, e.g. by the bus line B2 in order to control the transmission under the control of the computer unit 20. The computer unit 20 comprises an input-output section 21 connected to the bus lines B2 and B3 of the IEEE 1394 system. The input-output section 21 is connected to a data link block 22 and further to a host computer section 23 through an internal bus line 25 within the computer unit. Also, a program storage 24 in which a program for performing the transmission control is recorded in a recording medium such as a semiconductor memory or a hard disk, a magneto-optical disk, an optical disk, etc. is connected to the host computer section 23 through the internal bus line 25. The program stored in the program storage 24 for performing the transmission control is the program by which the processings described with the aforesaid embodiment are carried out.

Figures 25, 26:
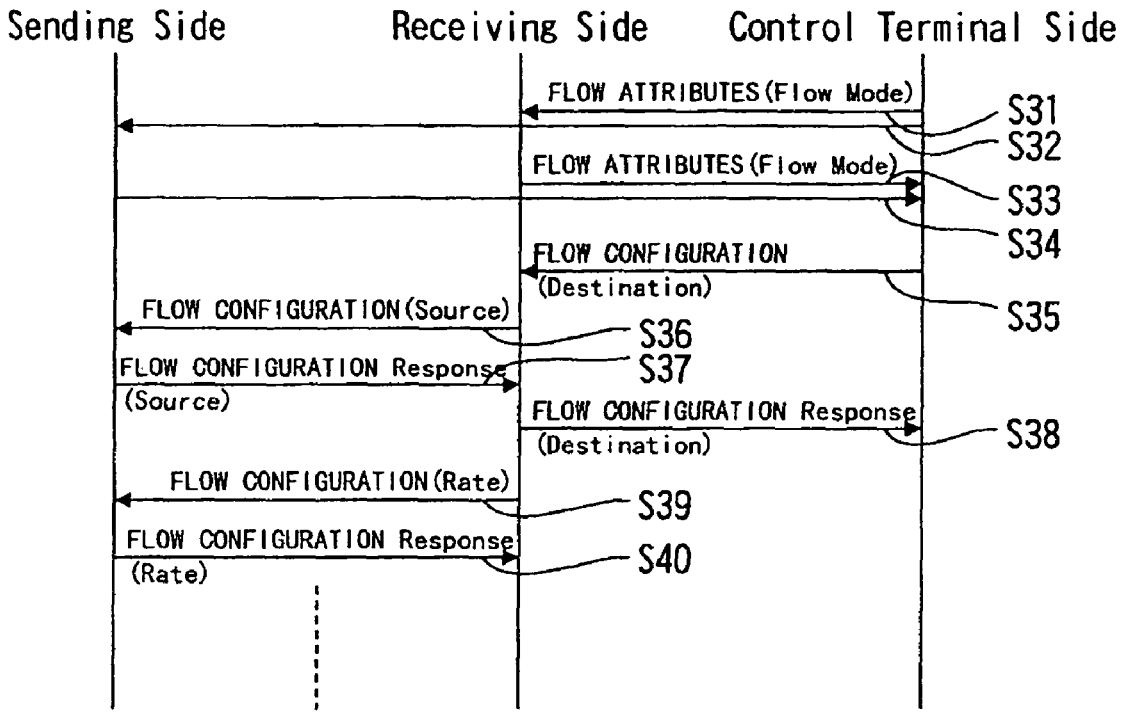
FIG. 25 illustrates an example of the control sequence of transmission processing (an example in which settings are made from another control terminal) applied to another mode for carrying out the present invention.
FIG. 26 illustrates an example of the setting command according to the example of FIG. 25.

When the transmission takes place under the control of the computer unit 20, it is performed, for example, in the control sequence shown in FIG. 25. Specifically, the computer unit 20 transmits first the transmission attributes commands S31 and S32 for examining the flow control mode to the playback unit 2 and the recording unit 3. The respective units 2 and 3 transmit to the computer unit 20 the transmission attributes commands S33 and S34 to which data on possible modes by the respective units are added. The transmission attributes commands S31 and S32 on this occasion are composed, as shown in FIG. 26 for example, so that it may be clear to be controlled under another terminal by adding ID of the computer unit 20.

Next, the computer unit 20 transmits to the recording unit 3 a command S35 for directing the mode selected among those examined modes, and the recording unit 3 transmits that direction to the playback unit 2 as a command S36. The playback unit 2 transmits a command S37 as a response thereto to the recording unit 3 which transmits further to the computer unit 20 a command S38 as a response thereto. On this transmission, the audio signal begins to be transmitted from the playback unit 2 to the recording unit 3.

Thereafter, when the playback unit 2 need adjust finely the reproduction rate, the recording unit 3 transmits the transmission setting command S39 for rate control. When the playback unit 2 receives this transmission setting command S39, it transmits to the recording unit 3 a response command S40 to that command and also adjusts finely the reproduction rate to such conditions as directed by that command.

By processing in this manner, it is also possible to perform the transmission under the control of the terminal unit other than the playback unit. Additionally, although the terminal unit is herein the computer unit, an exclusive control unit for directing the recording and reproduction may be employed. Alternatively, the other audio equipment such as the amplifying unit shown in FIG. 1 may also be employed as the control unit.

Having described in the foregoing embodiment a case where the present invention is applied to the audio system in which the sending side and receiving side are the compact disk playback unit and disk recording/playback unit, respectively, the present invention is not limited thereto and widely applicable to cases where the receiving side is made of an amplifier and the like.

Also, having described in the foregoing embodiment a case where the audio signal is transmitted over the transmission line for the IEEE 1394 format, the present invention is not limited thereto and widely applicable to cases where the audio signal is transmitted between equipments with various formats. In other words, if the transmission format is such that the isochronous transfer packet and the asynchronous transfer packet can be intermingled with each other like the IEEE 1394 format, it can be applied intactly. Moreover, it may be arranged that audio equipments on the reproducing side and recording side are connected with each other by means of a first transmission line and a second transmission line, and the audio signal is transmitted continuously over the first transmission line, whereas the control data, etc. is transmitted over the second transmission line. In this case, the second transmission line may be a wireless transmission line over which an infrared signal is transmitted by wireless.

Again, having described the foregoing embodiment in which the digital audio signal is transmitted between equipments, the present invention is not limited thereto and widely applicable to cases where the successive digital signal such as video signal, etc. is transmitted between equipments.

According to the present invention as described above, the transmission of digital signal from the digital signal sender to the digital signal destination can be performed in a more selected among the previously examined modes, thus allowing the digital signal to be transmitted securely in a predetermined mode. Therefore, for example, when the transmitted digital signal is recorded on some medium, it is possible to record in a prepared mode without fail.

In this case, because the modes that are set up comprises a mode in which sending out conditions of the digital signal from the digital signal sender is locked, it is ensured to record the digital signal transmitted under the mode-locked conditions and the like without any malfunction.

Furthermore, when comprising the locked mode, if the locked mode includes plural kinds of modes in which the reproduction speed of digital signal sent out of the digital signal sender are different respectively, it will then be possible to transmit and receive the digital signal reproduced at a reproduction speed selected among plural prepared reproduction speed and locked.

Moreover, when setting the locked transmission mode, by limiting those that can command to change from the locked transmission mode to the other transmission mode only to the digital signal destination which has caused to set the transmission mode, a malfunction due to the control from other equipment will be avoided.

Also, when setting the locked transmission mode, by adjusting the transmission rate of digital signal sent out of the digital signal sender under the command from the digital signal destination based on the receiving conditions of digital signal, it is possible to eliminate the jitters in transmission.

Furthermore, in the above described case, by issuing the command from the digital signal destination on the basis of the command transmitted from another terminal to the digital signal destination, it is possible to transmit satisfactorily under the control of another terminal other than the sender and destination.

Moreover, by issuing the command from the digital signal destination on the basis of the command transmitted from the digital signal sender to the digital signal destination, it is possible to make the mode setting, etc. under the control of digital signal destination also.

In addition, because the digital signal transmission method according to the present invention adds the flag indicating that the transmission rate is being adjusted based on the command from digital signal destination to the digital signal sent out of the digital signal sender, it is possible for the destination to check the flag and make the processing to eliminate the jitters or the like by the fine adjustment of transmission rate.

In this case, when the flag is raised, it is possible to adjust the transmission rate satisfactorily by issuing at least three kinds of transmission rate commands of the standard transmission rate, the rate higher than the standard transmission rate and the rate lower than the standard transmission rate based on the receiving conditions in the digital signal destination.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A digital signal transmission method for causing a second electronic equipment to receive a predetermined digital signal sent out of a first electronic equipment, comprising steps of

*an inquiry receiving step for receiving from the first electronic equipment a command for an inquiry;* an inquiry command sending step in which [the] *an* inquiry command for inquiring about modes of said digital signal that said first electronic equipment can send out is sent out to said first electronic equipment, a mode data sending step in which, in response to said inquiry command, mode data on the modes of said digital signal that said first electronic equipment can send out is sent out, a mode data acquiring step in which said mode data that is sent out is acquired, and a mode setting step in which, based on said mode data that is acquired, said digital signal of said first electronic equipment is set to [the] *a* desired mode.

2. The digital signal transmission method according to claim 1, wherein said modes include a locked mode in which conditions of said digital signal sent out of said first electronic equipment are locked.

3. The digital signal transmission method according to claim 2, wherein said locked mode includes [plural kinds] *a plurality* of reproduction speed modes in which the respective reproduction speeds of said digital signal sent out of said first electronic equipment are different.

4. The digital signal transmission method according to claim 2, wherein

[When] *when* said mode of said first electronic equipment is set to said locked mode, [such as can issue] a command to change from said locked mode to another mode is limited only to the equipment which has caused [to set] the [transmission] mode *to be set*.

5. The digital signal transmission method according to claim 3, further comprising a reproduction speed setting step in which, when the mode of said first electronic equipment is set to said locked mode, a reproduction speed mode of said digital signal sent out of said first electronic equipment is set.

[6. The digital signal transmission method according to claim 1, wherein a receiving step for receiving any command from other electronic equipment is provided, and said inquiry command is sent out based on said command received from said other electronic equipment in said inquiry command sending step.]

[7. The digital signal transmission method according to claim 6, wherein said other electronic equipment is said first electronic equipment.]

8. A digital signal transmission method for causing a second electronic equipment to receive a predetermined digital signal sent out of a [fist] *first* electronic equipment comprising steps of:

a receiving step for receiving a command to set a mode of said first electronic equipment to a mode of out putting at a desired transmission rate;

a mode setting step for setting the mode of said first electronic equipment to the mode of outputting at the desired transmission rate based on said command received;

a digital signal sending step for sending out the digital signal at said desired transmission rate based on the mode set in said mode setting step; and a flag adding step for adding to said digital signal sent out a flag which indicates that a transmission rate is being adjusted.

9. The digital signal transmission method according to claim 8, wherein in said mode setting step, any one of at least three [kinds of the] transmission rates of a standard transmission rate which is normal, a high speed transmission rate which is higher in speed than the standard transmission rate and a low speed transmission rate which is lower in speed than the standard transmission rate is set.

10. A digital signal transmission system in which a predetermined digital signal sent out of a first electronic equipment is received by a second electronic equipment connected thereto by means of a predetermined transmission line which is capable of bidirectional communication, wherein said first electronic equipment comprises:

a mode setting means for setting a sending mode of said digital signal;

a mode controlling means for performing [the] control in accordance with the mode set by said mode setting means; and a sender transmitting means for communicating with a partner connected by said transmission line, and said second electronic equipment comprises:

a transmission control means for controlling the transmission of said digital signal;

a destination transmitting means for communicating with a partner connected by said transmission line;

said destination transmitting means sends out an inquiry command for inquiring about data concerning a mode of said first electronic equipment at the request of said transmission control means of said second electronic equipment *and in response to a command from said first electronic equipment for said inquiry command*;

said sender transmitting means sends out mode data concerning said mode of said first electronic equipment based on said inquiry command;

said destination transmitting means sends out a mode setting command for setting a mode selected by said transmission control means of said second electronic equipment in accordance with said mode [date] *data* transmitted; and said mode setting means of said first electronic equipment sets a mode for transmitting said digital signal based on said mode setting command.

11. The digital signal transmission system according to claim 10, wherein:

said transmission line [is such as] enables isochronous transfer and asynchronous transfer; and said sender transmitting means and said destination transmitting means transmit the respective commands and mode data in the asynchronous transfer, and transmit said digital signal in the isochronous transfer.

12. The digital signal transmission system according to claim 10, wherein the modes set by said mode setting means include a locked mode in which conditions of said digital signal sent out of said first electronic equipment are locked.

13. The digital signal transmission system according to is claim 12, wherein said locked mode includes [plural kinds] *a plurality* of reproduction speed modes in which reproduction speeds of said digital signal sent out of said first electronic equipment are different, respectively.

14. The digital signal transmission system according to claim 12, wherein when said mode of said first electronic equipment is set to said locked mode, [such as] *said sending mode* can change from the locked transmission mode to other transmission which has sent out the mode setting command.

15. The digital signal transmission system according to claim 12, wherein:

at the request of said transmission control means of said second electronic equipment, when said digital signal of said first electronic equipment is set to said locked mode, said destination transmitting means outputs a transmission rate setting command for setting the transmission rate of the digital signal sent out of said first electronic equipment; and said mode controlling means of said first electronic equipment controls the transmission rate of said digital signal based on said transmission rate setting command.

[16. The digital signal transmission system according to claim 10, wherein:

said destination transmitting means performs date transmission with other electronic equipment connected to said transmission line; and said destination transmitting means issues said inquiry command to said first electronic equipment based on a command in which said destination transmitting means receives from said other electronic equipment.]

[17. The digital signal transmission system according to claim 16, wherein said other electronic equipment is said first electronic equipment.]

18. A digital signal transmission system in which a predetermined digital signal sent out of a first electronic equipment is received by a second electronic equipment connected thereto through a predetermined transmission line which is capable of bidirectional communication, wherein:

said [fist] *first* electronic equipment comprises a sending control means for controlling conditions of said digital signal sent out, and a sender transmitting means for communicating with a partner connected through said transmission line;

second electronic equipment comprises a receiving control means for controlling conditions of said digital signal received, and a destination transmitting means for communicating with a partner connected through said transmission line; and a flag is added to said digital signal sent out of said sender transmitting means at its predetermined position, which indicates that a transmission rate is being adjusted based on a command from said receiving control means of said [digital signal destination] *second electronic equipment*.

19. The digital signal transmission system according to claim 18, wherein said receiving control means performs, based on receiving conditions of said second electronic equipment, setting of any one of at least three [kinds of the] transmission rates of a standard transmission rate which is normal, a high speed transmission rate which is higher in speed than the standard transmission rate and a low speed transmission rate which is lower in speed than the standard transmission rate.

20. A digital signal transmitting apparatus for transmitting a predetermined digital signal to an electronic equipment connected through a predetermined transmission line, comprising

*a receiving means for receiving from said electronic equipment an inquiry for mode information;* a mode setting means for setting a sending mode of said digital signal, and a transmitting means for communicating with said electronic equipment connected through said transmission line and also sending out *a command for said inquiry,*

*and* mode [date] *data* on modes which can be set by said mode setting means *in response to said inquiry*.

21. The digital signal transmitting apparatus according to claim 20, wherein a receiving means for receiving any command from other electronic equipment is further provided, and said mode setting means sets the mode based on a mode specifying command which is received by said receiving means.

22. The digital signal transmitting apparatus according to claim 21, wherein the modes set by said mode setting means include a locked mode in which the mode set by said mode setting means is locked.

23. The digital signal transmitting apparatus according to claim 22, wherein the locked mode set by said mode setting means includes [plural kinds] *a plurality* of reproduction speed modes in which the-reproduction speeds of said digital signal are different, respectively.

24. The digital signal transmitting apparatus according to claim 22, wherein when said mode setting means sets the locked mode, the locked mode is released only when said transmitting means decides that a release command is issued from [the] predetermined electronic equipment connected through said predetermined transmission line.

25. A digital signal [transmitting] *receiving* apparatus for receiving a predetermined digital signal transmitted from an electronic equipment connected through a predetermined transmission line, comprising

*receiving means for receiving from said electronic equipment a request to send an inquiry command;* a control means for producing a command to inquire of said electronic equipment connected through said transmission line about data on modes in which said digital signal can be sent out, and a transmitting means for sending out the command produced by said control means to said transmission line.

26. The digital signal transmitting apparatus according to claim 25, wherein said control means derives plural modes which can be sent out from a response to the command sent out by said transmitting apparatus and also produces a setting command for setting said electronic equipment to a desired mode selected among said plural modes, and said transmitting means sends out said setting command to said transmission line.

27. A digital signal transmitting apparatus for transmitting a predetermined digital signal to an electronic equipment connected through a predetermined transmission line, comprising a sending rate control means for controlling the sending rate of said digital signal, an output means for communicating with said electronic equipment connected through said transmission line and also outputting said digital signal under the control of said sending rate control means, and a flag adding means for adding a flag to said digital signal sent out at its predetermined position, which indicates that the sending rate is being controlled.

28. The digital signal transmitting apparatus according to claim 27, wherein said sending rate control means sets, based on [the] *a* command from said electronic equipment connected through said transmission line, any one of at least three [kinds of the] sending rates of a standard sending rate which is normal, a high speed sending rate which is higher in speed than the standard sending rate and a low speed sending rate which is lower in speed than the standard sending rate.

29. A digital signal [transmitting] *receiving* apparatus *comprising*

*a receiving means* for receiving a predetermined digital signal transmitted from an electronic equipment connected through [said] *a* transmission line and also extracting flag added to received data at its predetermined position, and a control means for producing an adjusting command to cause said electronic equipment connected through said transmission line to adjust a transmission rate of said digital signal and transmitting said adjusting command to said electronic equipment through said transmission line, if the flag extracted is under a predetermined condition.

30. A *non-transitory* recording medium on which a program controlling the transmission of a predetermined digital signal between at least a first electronic equipment and a second electronic equipment is recorded, the recorded program*, which when executed, causes the second electronic equipment to execute a process* comprising steps of

*an inquiry receiving step for receiving from the first electronic equipment a command for an inquiry;* an inquiry command sending step in which [the] *an* inquiry command for inquiring about modes of said digital signal that said first electronic equipment can send out is caused to be sent to said first electronic equipment, a mode data acquiring step in which, based on a response to said inquiry command, mode data on the modes of said digital signal that said first electronic equipment can send out is caused to be acquired, and a mode setting step in which, based on said mode data, the mode of said digital signal of said first electronic equipment is caused to be set.

31. A *non-transitory* recording medium on which a program for controlling the transmission of a predetermined digital signal between at least a first electrode equipment and a second electronic equipment is recorded, the recorded program*, which when executed, causes the first electronic equipment to execute a process* comprising steps of

*a transmitting step for transmitting an inquiry command to said second electronic equipment requesting a mode setting command;* a mode [date] *data* sending step in which, in response to [an] *the* inquiry command, mode data on the modes of said digital signal that said first electronic equipment can send out is sent, and a mode setting step in which, in response to [an] *a* command for causing a desired mode based on said mode data to be set, the mode of said signal of said first electronic equipment is caused to be set.

*32. A method for causing a second apparatus to receive a predetermined digital signal sent from a first apparatus, comprising the steps of:*

*receiving from said first apparatus a command for an inquiry;*

*sending to said first apparatus an inquiry command to inquire about attribute modes of the digital signal that can be sent from said first apparatus;*

*receiving from said first apparatus responsive to said inquiry command, attribute mode data representing the attribute modes of the digital signal that can be sent from said first apparatus;*

*selecting from said attribute mode data a desired attribute mode of said digital signal; and*

*sending to said first apparatus an attribute mode request that specifies said selected attribute mode of the digital signal to be transmitted to said second apparatus.*

*33. The method according to claim 32, wherein said attribute modes include a locked mode in which the condition of said digital signal sent from said first apparatus is locked.*

*34. The method according to claim 33, wherein said locked mode includes a plurality of reproduction speed modes of said digital signal that can be sent from said first apparatus.*

*35. The method according to claim 34, further comprising:*

*setting a reproduction speed mode of said digital signal sent from said first apparatus when the attribute mode of said digital signal is set to said locked mode.*

*36. The method according to claim 33, further comprising the step of setting said digital signal to said locked mode, thereafter only the apparatus which has set said digital signal to said locked mode can issue a command to change from said locked mode to another mode.*

*37. A method for causing a first apparatus to send a predetermined digital signal to a second apparatus, comprising the steps of:*

*transmitting to the second apparatus a command requesting the second apparatus to send an inquiry command*

*receiving from the second apparatus the inquiry command inquiring about attribute modes of the digital signal that can be sent from said first apparatus;*

*sending to the second apparatus, in response to said inquiry command, attribute mode data representing the attribute modes of the digital signal that can be sent from said first apparatus;*

*receiving an attribute mode request specifying an attribute mode selected by the second apparatus; and*

*transmitting the digital signal using the selected attribute mode.*

*38. The method according to claim 37, further comprising:*

*adding to said digital signal a flag indicating the attribute mode of the transmitted digital signal.*

*39. The method according to claim 37, wherein said attribute modes include a standard digital signal transmission rate, a high speed digital signal transmission rate which is higher in speed than the standard transmission rate, and a low speed digital signal transmission rate which is lower in speed than the standard transmission rate.*

*40. A system in which a predetermined digital signal sent from a first apparatus is received by a second apparatus,*

*wherein said first apparatus comprises:*

*i) means for transmitting to the second apparatus a command requesting the second apparatus to send an inquiry command;*

*ii) means for receiving from the second apparatus the inquiry command inquiring about attribute modes of the digital signal that can be sent from said first apparatus;*

*iii) means for sending to the second apparatus, in response to said inquiry command, attribute mode data representing the attribute modes of the digital signal that can be sent from said first apparatus;*

*iv) means for receiving an attribute mode request specifying an attribute mode selected by the second apparatus; and*

*v) means for transmitting the digital signal using the selected attribute mode, and*

*wherein said second apparatus comprises:*

*i) means for sending to said first apparatus said inquiry command;*

*ii) means for receiving from said first apparatus responsive to said inquiry command, said attribute mode data;*

*iii) means for selecting from said attribute mode data a desired attribute mode of said digital signal; and*

*iv) means for sending to said first apparatus the attribute mode request that specifies said selected attribute mode of the digital signal to be transmitted to said second apparatus.*

*41. The system according to claim 40,*

*wherein said first and second apparatus are connected by a transmission channel operatively configured to enable isochronous transfer and asynchronous transfer, and*

*wherein the inquiry command, the attribute mode data, and the attribute mode request are transmitted as asynchronous transfer, and the digital signal is transmitted as isochronous transfer.*

*42. The system according to claim 40, wherein said attribute modes include a locked mode in which the condition of said digital signal sent from said first apparatus is locked.*

*43. The system according to claim 42, wherein said locked mode includes a plurality of reproduction speed modes of said digital signal that can be sent from said first apparatus.*

*44. The system according to claim 42, wherein said digital signal sent from said first apparatus is operable to be set to said locked mode, thereafter only the apparatus which has set said digital signal to said locked mode can issue a command to change from said locked mode to another mode.*

*45. The system according to claim 42,*

*wherein when said digital signal is sent from said first apparatus in said locked mode, the second apparatus outputs a transmission rate setting command for setting a transmission rate of the digital signal sent from said first apparatus; and*

*wherein said first apparatus controls the transmission rate of said digital signal based on said transmission rate setting command.*

*46. A second apparatus for receiving a predetermined digital signal transmitted from a first apparatus, the second apparatus comprising:*

*means for receiving from said first apparatus a command for an inquiry;*

*means for sending to said first apparatus the inquiry command to inquire about attribute modes of the digital signal that can be sent from said first apparatus;*

*means for receiving from said first apparatus responsive to said inquiry command, attribute mode data representing the attribute modes of the digital signal that can be sent from said first apparatus;*

*means for selecting from said attribute mode data a desired attribute mode of said digital signal; and*

*means for sending to said first apparatus an attribute mode request that specifies said selected attribute mode of the digital signal to be transmitted to said second apparatus.*

*47. The second apparatus according to claim 46, wherein said attribute modes include a locked mode in which the condition of said digital signal sent from said first apparatus is locked.*

*48. The second apparatus according to claim 47, wherein said locked mode includes a plurality of reproduction speed modes of said digital signal that can be sent from said first apparatus.*

*49. The second apparatus according to claim 48, further comprising:*

*means for setting a reproduction speed mode of said digital signal sent from said first apparatus when the attribute mode of said digital signal is set to said locked mode.*

*50. The second apparatus according to claim 47, further comprising means for setting said digital signal to said locked mode, thereafter only the apparatus which has set said digital signal to said locked mode can issue a command to change from said locked mode to another mode.*

*51. A first apparatus for transmitting a predetermined digital signal to a second apparatus, the first apparatus comprising:*

*means for transmitting to the second apparatus a command requesting the second apparatus to send an inquiry command;*

*means for receiving from the second apparatus the inquiry command inquiring about attribute modes of the digital signal that can be sent from said first apparatus;*

*means for sending to the second apparatus, in response to said inquiry command, attribute mode data representing the attribute modes of the digital signal that can be sent from said first apparatus;*

*means for receiving an attribute mode request specifying an attribute mode selected by the second apparatus; and*

*means for transmitting the digital signal using the selected attribute mode.*

*52. The first apparatus according to claim 51, further comprising:*

*means for adding to said digital signal a flag which indicates the attribute mode of the transmitted digital signal.*

*53. The first apparatus according to claim 51, wherein said attribute modes include a standard digital signal transmission rate, a high speed digital signal transmission rate which is higher in speed than the standard transmission rate, and a low speed digital signal transmission rate which is lower in speed than the standard transmission rate.*

*54. A non-transitory computer-readable storage medium, carrying a processing program stored thereon, which when executed, causes a second apparatus to execute a process of receiving a predetermined digital signal transmitted from a first apparatus, the process comprising the steps of:*

*receiving from said first apparatus a command for an inquiry;*

*sending to said first apparatus an inquiry command to inquire about attribute modes of the digital signal that can be sent from said first apparatus;*

*receiving from said first apparatus responsive to said inquiry command, attribute mode data representing the attribute modes of the digital signal that can be sent from said first apparatus;*

*selecting from said attribute mode data a desired attribute mode of said digital signal; and*

*sending to said first apparatus an attribute mode request that specifies said selected attribute mode of the digital signal to be transmitted to said second apparatus.*

*55. The storage medium according to claim 54, wherein said attribute modes include a locked mode in which the condition of said digital signal sent from said first apparatus is locked.*

*56. The storage medium according to claim 55, wherein said locked mode includes a plurality of reproduction speed modes of said digital signal that can be sent from said first apparatus.*

*57. The storage medium according to claim 56, wherein the process further comprises:*

*setting a reproduction speed mode of said digital signal sent from said first apparatus when the attribute mode of said digital signal is set to said locked mode.*

*58. The storage medium according to claim 55, wherein said process further comprises the step of setting said digital signal to said locked mode, thereafter only the apparatus which has set said digital signal to said locked mode can issue a command to change from said locked mode to another mode.*

*59. A non-transitory computer-readable storage medium, carrying a processing program stored thereon, which when executed, causes a first apparatus to execute a process of transmitting a predetermined digital signal to a second apparatus, the process comprising the steps of:*

*transmitting to the second apparatus a command for an inquiry;*

*receiving from the second apparatus an inquiry command inquiring about attribute modes of the digital signal that can be sent from said first apparatus;*

*sending to the second apparatus, in response to said inquiry command, attribute mode data representing the attribute modes of the digital signal that can be sent from said first apparatus;*

*receiving an attribute mode request specifying an attribute mode selected by the second apparatus; and*

*transmitting the digital signal using the selected attribute mode.*

*60. The storage medium according to claim 59, wherein the process further comprises:*

*adding to said digital signal a flag which indicates the attribute mode of the transmitted digital signal.*

*61. The storage medium according to claim 59, wherein said attribute modes include a standard digital signal transmission rate, a high speed digital signal transmission rate which is higher in speed than the standard transmission rate, and a low speed digital signal transmission rate which is lower in speed than the standard transmission rate.*

* * * * *